July 16, 1957 R. W. TRIPP ET AL 2,799,835
POSITION MEASURING TRANSFORMER
Filed May 18, 1955 9 Sheets-Sheet 1
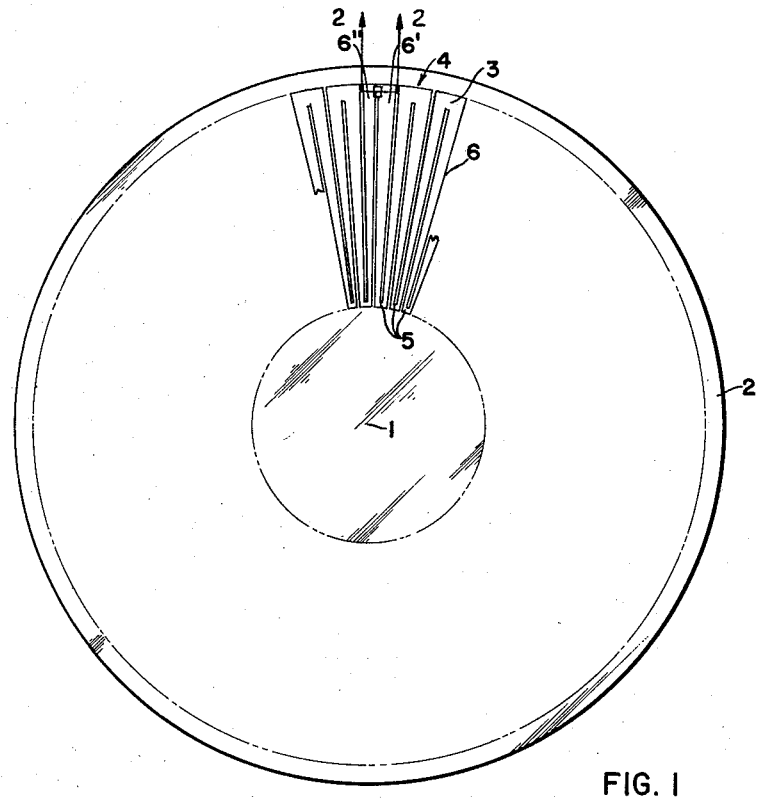
FIG. 1
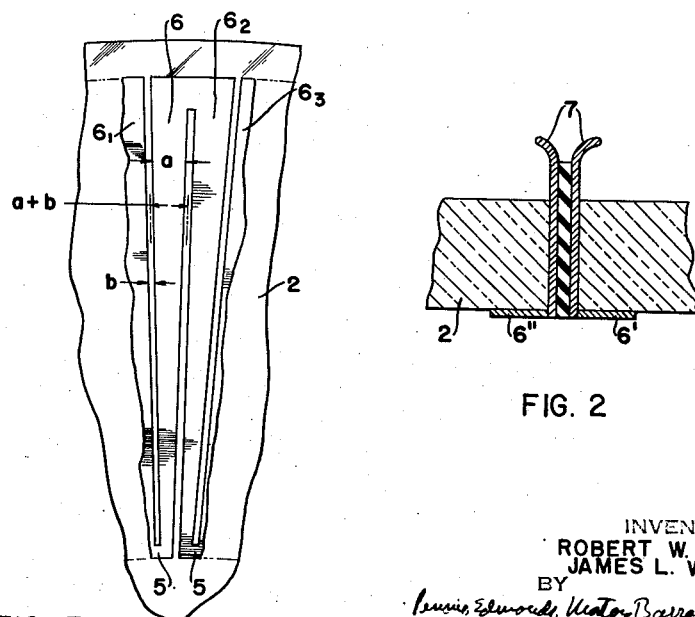
FIG. 3
FIG. 2
INVENTORS
ROBERT W. TRIPP
JAMES L. WINGET
BY
ATTORNEYS July 16, 1957  R. W. TRIPP ET AL  2,799,835
POSITION MEASURING TRANSFORMER
Filed May 18, 1955  9 Sheets-Sheet 4

INVENTORS
ROBERT W. TRIPP
JAMES L. WINGET
BY
ATTORNEYS

July 16, 1957     R. W. TRIPP ET AL     2,799,835
POSITION MEASURING TRANSFORMER
Filed May 18, 1955     9 Sheets-Sheet 5

INVENTORS
ROBERT W. TRIPP
JAMES L. WINGET
BY
ATTORNEYS

July 16, 1957 — R. W. TRIPP ET AL — 2,799,835
POSITION MEASURING TRANSFORMER
Filed May 18, 1955 — 9 Sheets-Sheet 7
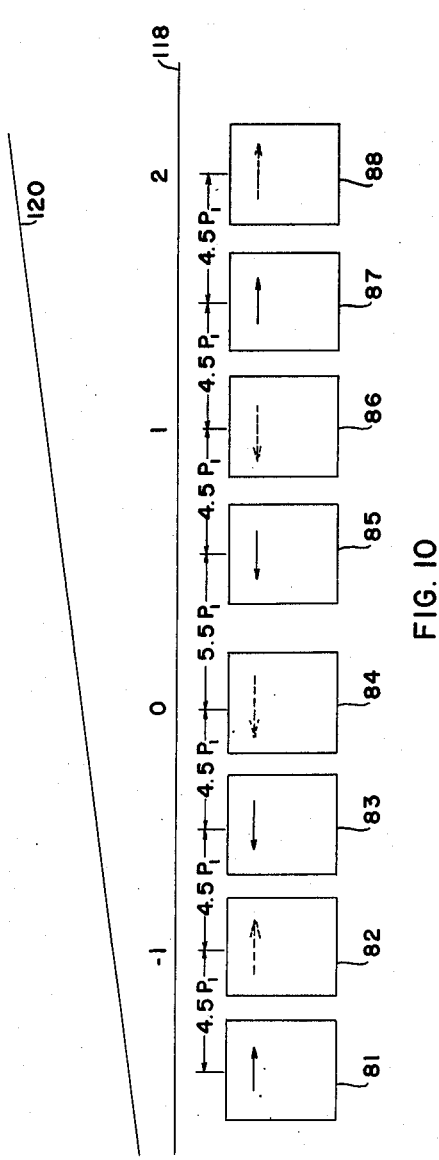
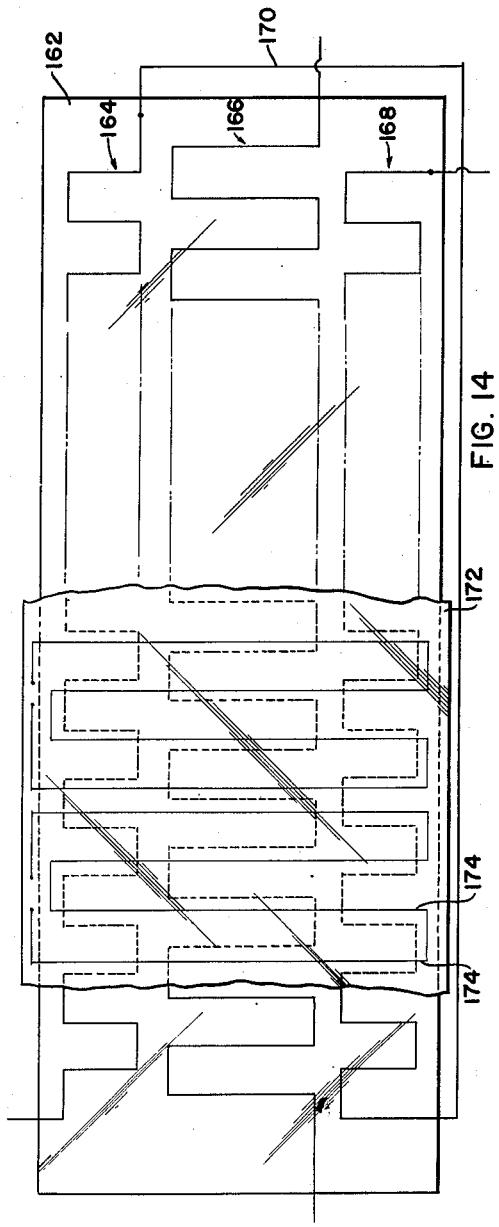
INVENTORS
ROBERT W. TRIPP
JAMES L. WINGET
BY
Pennie, Edmonds, Morton, Barrows & Taylor
ATTORNEYS July 16, 1957 R. W. TRIPP ET AL 2,799,835
POSITION MEASURING TRANSFORMER
Filed May 18, 1955 9 Sheets-Sheet 8

INVENTORS
ROBERT W. TRIPP
JAMES L. WINGET
BY
Pennie, Edmonds, Morton, Barrows + Taylor
ATTORNEYS July 16, 1957  R. W. TRIPP ET AL  2,799,835
POSITION MEASURING TRANSFORMER
Filed May 18, 1955  9 Sheets-Sheet 9

INVENTORS
ROBERT W. TRIPP
JAMES L. WINGET
BY
Bennie, Edmonds, Morton, Barrows & Taylor

ATTORNEYS

United States Patent Office 2,799,835
Patented July 16, 1957

2,799,835
POSITION MEASURING TRANSFORMER

Robert W. Tripp, Bronxville, and James L. Winget, White Plains, N. Y., assignors, by mesne assignments, to Inductosyn Corporation, Carson City, Nev., a corporation of Nevada Application May 18, 1955, Serial No. 509,168

24 Claims. (Cl. 336—123)

This invention relates to transformers operating by inductive coupling, and more particularly to transformers having multipolar windings which are useful as position determining devices. Transformers for this purpose have been proposed heretofore, for example in the form of primary and secondary windings each comprising a multiplicity of series-connected radially disposed conductors arranged on the adjacent faces of two coaxially supported disks. In these known devices the angular spacing of the conductors is the same on both disks, and when the series-connected conductors of one winding are energized with an alternating voltage, the current in each conductor of that winding induces a voltage in the conductor of the other winding which happens to be adjacent thereto and these voltages add at the terminals of the other winding to give a secondary voltage which varies in magnitude according to the relative angular position of the disks, over a cycle measured by the angular spacing, center to center, of three adjacent radial conductors on either of the disks.

The secondary voltage produced by the primary current is a function of the relative position of the transformer members. This function, which will hereinafter be termed the coupling wave of the transformer, is cyclical in the cycle of relative position of the disks just defined. By the provision of a very large number of poles of the order of 1000 or more in number, it has been supposed that the relative angular position of the two disks could be read to a very high degree of accuracy, and that the more radial conductor cycles the smaller would be that cycle and hence the greater the attainable accuracy.

In fact, however, various factors have limited the accuracy obtainable with transformers of this type as heretofore proposed. Either ferromagnetic or air cored transformers can be used. The use of ferromagnetic cores requires greater care because of the adverse effect of inhomogeneities in permeability thereof on the obtainable accuracy. When iron cores of low permeability or air cores are used, the inductive coupling factor achieved is very low. With such low inductive coupling factors and with the very large numbers of poles heretofore proposed, capacitive coupling between the primary and secondary windings has been found to be significant by comparison with inductive coupling, and since this capacitive coupling is a different function of the relative position of the transformer members, its presence has resulted in difficulty or impossibility in interpreting the observed secondary voltage as an indication of the relative position of the transformer members. In addition, a component of inductive coupling has been found to exist due to the circumferential current paths existing on the disks in the conductors by which the successive radial conductors are connected in series. This component is independent of relative angular position of the members, at least over intervals much larger than the radial conductor cycle, and by adding to or subtracting from the cyclically varying coupling wave it falsifies the observed coupling on which measurement of relative disk position depends. Errors due to decentering of the patterns with respect to each other and with respect to the centers of relative rotation also falsify the coupling wave in a similar manner.

Furhermore, it has been found that the coupling wave is not in general sinusoidal in shape, even though it is cyclical. For many purposes, this is a serious disadvantage. For example, transformers of the general type above referred to can be used for the transmission and repetition of angular position data, if one transformer member is provided with two windings in space quadrature of the conductor cycle. While theoretically such systems, similar in principle to the iron cored synchros of power line frequencies, do not requnre for their operation coupling waves of sinusoidal shape free from harmonics, in practice the magnitude of the coupling between the transformer members varies with changes in axial spacing between them in different ways for the fundamental and harmonic components of a non-sinusoidal coupling wave. Consequently, if the potential accuracies of such a system are to be realized, axial play and deviation of the disk faces from perpendicularity to their axis of relative rotation must be held to uneconomically low limits if coupling waves of other than sinusoidal shape are permitted.

The invention provides multipolar transformers operating by inductive coupling in which these disadvantages have been largely suppressed, and adapted either to the measurement of angles in rotary embodiments or to the measurement of linear position in linear embodiments. The invention will now be further described by reference to the accompanying drawings in which:

Fig. 1 is a plan view of a rotary transformer member according to the invention including a single continuous winding;

Fig. 2 is an enlarged sectional view taken on the section line 2—2 of Fig. 1;

Fig. 3 is a plan view at an enlarged scale of a portion of the transformer member of Fig. 1;

Fig. 10 is a diagram useful in explaining certain features of construction embodied in the transformer member of Fig. 9;

Fig. 14 is a plan diagrammatic view of another form of linear transformer member according to the invention including two continuous windings in space quadrature;

Figure 7:
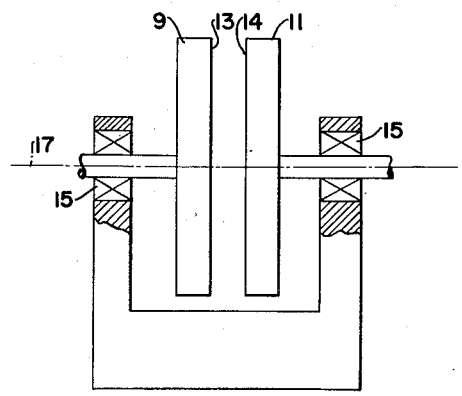
Fig. 7 is a view in side elevation of a complete transformer according to the invention.

The invention will first be described in terms of its application to the measurement of angular position. One form of transformer according to the invention for the measurement of angular position is generally illustrated in Fig. 7. It includes two disks 9 and 11 made of non-ferromagnetic and non-conducting material such as glass having plane faces 13 and 14 respectively and mounted in bearings 15 for relative rotation in an axis 17 to which the disk faces 13 and 14 are perpendicular. Either or both of the disks 9 and 11 may be rotatable with respect to the surrounding frame of reference; it is sufficient that the disks be rotatable with respect to each other. Of course the disks need not be round in shape; the outline of the disks is immaterial, although they are advantageously round and centered on the axis of relative rotation. The disk or disks movably mounted must be restrained against relative axial motion so that the spacing between the disk faces 13 and 14 will remain constant within reasonably close tolerances which, for disks bearing winding patterns of the order of 2 to 4 inches in diameter, may be of the order of 2 or 3 thousandths of an inch in a nominal separation of some 5 thousandths of an inch. The bearings 15 may be designed according to well known methods to include thrust elements limiting the endwise play of the disks.

Figure 4:
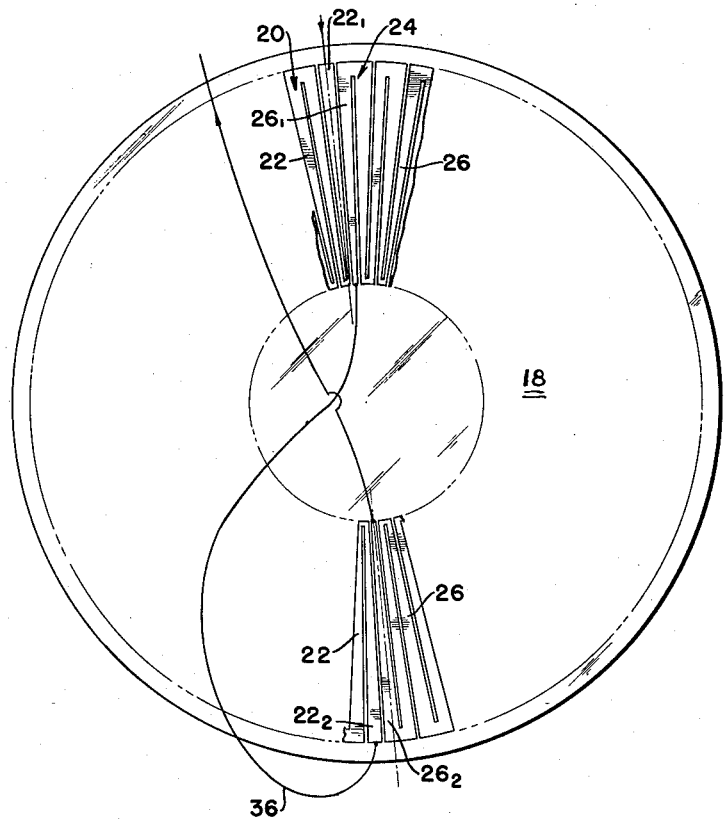
Fig. 4 is a view similar to that of Fig. 1 but illustrating a modified single winding rotary transformer member according to the invention.

The faces 13 and 14 bear each one or more windings of the types illustrated in Figs. 1–5, at least one face bearing a winding of one of the types illustrated in Figs. 1 and 4. There may be one or more primary windings and one or more secondary windings, all primary windings (if plural) being fixed with respect to each other and all secondary windings (if plural) being fixed with respect to each other, all primary windings being movable as a unit with respect to all secondary windings. Either winding or group of windings so fixed with respect to all other windings may serve as the primary or as the secondary winding or windings of the transformer and the terms "rotor" and "stator," if desired, may be interchangeably applied to either of such groups of relatively fixed windings and to the support therefor. Hereinafter the term "member" will be applied to any one of such groups of windings of a transformer according to the invention, together with the support or supports therefor. Conveniently however the member including a continuous winding of one of the types shown in Figs. 1 and 4 may be referred to as the rotor or primary member of the transformer.

Now returning to Figs. 1–6 for a detailed description of the features of the invention as applied to rotary transformers, Fig. 1 is a plan view of a rotory transformer member according to the invention including a single continuous multipolar winding. A transformer useful in measuring the relative angular position of two shafts may be produced by combining two members of the type illustrated in Fig. 1 in the relation shown in Fig. 7, although improved results are obtained by combining a member of the type illustrated in Fig. 1 with a member of the type illustrated in Fig. 4 and, especially, with a member of the type illustrated in Fig. 5.

The transformer member of Fig. 1 carries a single multipolar winding extending over 360° of a circle. A disk 2 of non-conducting, non-ferromagnetic material such as glass bears deposited on its face, which is preferably substantially plane, a single multipolar winding generally indicated at 4. The winding 4 includes a multiplicity of radially extending strip-like conductors 6 connected in series by circumferential conductors 3 and 5 so that alternate conductors 6 carry current in the same direction whereas adjacent conductors 6 carry current in radially opposite directions. The conductors 6 are identical in shape and are spaced at uniform angular intervals in a circularly arcuate array about the center 1 of a pattern which they establish, the center 1 becoming the effective center of the disk. Only a few conductors are shown in Fig. 1, but they cover in uniform fashion the 360° of angle about the disk center.

According to one feature of the invention to be more fully described hereinafter, the number of radial conductors is selected to be of the order of magnitude of one hundred. The number must be an even one in order that, for a given polarity of energizing voltage applied to the winding, the sense of the magnetic fields appearing adjacent the disk face in front of the individual radial conductors will alternate all the way around the disk, and in particular in the two adjacent conductors at which the winding terminates. A total of one hundred and eight radial conductors has been found highly satisfactory in practice.

The conductors 6 are laid down in the form of a metallic deposit, for example of silver, by a photoetching process, and must be positioned with a relatively high degree of accuracy, although the large number of conductors provided effects an averaging process in the over-all coupling between the two transformer members whereby the effect of deviations of individual conductors from their proper positions is decreased or reduced. Transformer members of the type illustrated in Figs. 1 and 5 have been successfully built and operated with inner and outer radii for the conductor patterns of the order of one-half and one and one-half inches, respectively, although the invention is not limited by any particular dimensions.

The winding 4 terminates at two adjacent conductors 6' and 6" conveniently at the radially outer ends thereof, and leads are attached to these conductors for energization of the winding or alternatively for lead off of an induced voltage to measuring or terminating apparatus. To minimize the disturbing effects of the leads on the desired coupling waves, the plate 2 is advantageously slotted, and leads 7, suitably insulated from each other, are passed through the disk to connect with conductors 6', 6", as illustrated in Fig. 2.

In certain of their embodiments the transformers of the invention may incorporate as primary and secondary members two members of the type illustrated in Fig. 1, mounted coaxially with a close spacing of the order of a few thousandths of an inch as illustrated in Fig. 7. In such an embodiment, the novel features of which will be described with reference to Fig. 3, the magnitude of the voltage induced in the secondary member by an alternating voltage in the primary member will be a function of the relative angular position of the two members in their axis of relative rotation, shown at 17 in Fig. 7, this function repeating in a cycle of relative angular movement equal to 360 divided by one-half the number of radial conductors on either member, both members having the same number of radial conductors. Thus with two members each including one hundred and eight conductors as suggested in the above description of Fig. 1, there are fifty-four relative angular positions of the two members of the transformer now under consideration for which the magnitude and sign of the voltage induced in the secondary member will have the same relation to the exciting voltage applied to the primary. The cycle is accordingly 6⅔°. A lesser number of conductors may however be provided on either or both of the transformer members, i. e. the circularly arcuate array of conductors may fill less than 360° on either or both of the transformer members although it must fill 360° on at least one of them if angular measurement is to be made throughout a complete revolution of relative positions. Preferably moreover the patterns are as nearly symmetric in the center of the disks as possible so that it is advantageous, in embodiments both of whose members are of the types illustrated in Figs. 1 and 4, to have them cover the entire 360° of a circle.

It is however by no means necessary for both members to have the same number of "active" conductors, i. e. conductors having with the conductors of the other member a relation of inductive coupling which varies in a cyclic manner with the relative position of the two transformer members. Indeed in preferred embodiments of the invention the number of active conductors is not the same on both transformer members.

Assuming a transformer including one member of the type illustrated in Fig. 1, there are one hundred and eight relative angular positions of the two members in which each conductor of one member is parallel to and at a minimum separation from one conductor of the other member. Fifty-four of these one hundred and eight relative positions represent positions of maximum coupling of one sign between the transformer members, whereas the other fifty-four represent positions of maximum coupling of the opposite sign. The coupling wave or ratio of secondary voltage in each conductor 6 of the secondary member to primary current in the adjacent conductor 6 of the primary member is thus seen to go through fifty-four cycles for one relative revolution of the two transformer members. The coupling function or coupling wave of the complete transformer is the sum of the contributions of each of the series-connected secondary winding conductors, whether there are one hundred and eight or a lesser number.

In the structure as thus far described however the coupling function, whether of the complete transformer or of one secondary pole or conductor, is not in general sinusoidal. It will contain substantial harmonic ingredients, made up primarily of odd-numbered harmonics in view of the symmetry in the relative positioning of the conductors of the primary and secondary members on opposite sides of the positions of juxtaposition which give the maximum coupling values. According to one feature of the invention the conductors are dimensioned to minimize harmonic components in the coupling wave between members having uniformly and equally spaced conductors as has been hitherto assumed. This feature of the invention will be described in conjunction with Fig. 3. Fig. 3 is an enlarged fragmentary view of a portion of the transformer member of Fig. 1. A plurality of successive radial conductor bars 6 are shown, connected in series by circumferential conducting portions 3 at the radially outer limit of the transformer member and 5 at the radially inner limit of the radial conductors. The angular pitch of successive radial conductors 6, $6_1$, etc. is uniform. In the example assumed with one hundred and eight such conductors this pitch is of exactly 3⅓°.

A conductor 6, of width or circumferential dimension $a$ and the appurtenant spacing identified in Fig. 3 by the circumferential dimension $b$ may be referred to as one of the "poles" of the member, in view of the fact that for each half cycle in time of the energizing voltage, whether the member in question is a primary or secondary, there will be associated with such a "pole" a magnetic field surrounding the radial or active portion of the conductor thereof and having adjacent the face of the member presented to the other transformer member either a clockwise or a counterclockwise direction for its lines of force. The lines of force in front of the conductors of the adjacent poles will of course have the opposite direction. Two adjacent of said poles form together what will hereinafter be referred to as a "pole cycle" which may be divided into 360 electrical degrees.

According to the feature of the invention illustrated in Fig. 3, the presence of any given harmonic in the coupling wave may be minimized by giving to the inductively active conductors 6 a width $a$ amounting to an appropriate fraction of the circumferential dimension $a+b$ of the pole. If $a/(a+b)$ is equal to $2c/d$, $c$ being any integer and $d$ being any integer, the coupling wave will be substantially free of harmonic content of the order $d$. Thus for the suppression of third harmonic ingredient in the coupling waves, applicants have found it advantageous to make the ratio $a/(a+b)$ equal to two-thirds, the integer $c$ being set equal to unity. A dimensioning of the conductors of either transformer member according to the formula just indicated is effective for the suppression of the appropriate harmonic in the coupling wave. Two different harmonics can be substantially eliminated by this method by the application to the two transformer members of different ratios.

The winding patterns employed in transformer members according to the invention may conveniently include, in rotary as well as linear applications, active conductors which are separated by rectangular spaces of uniform width since this facilitates generation of the patterns. With such rectangular spaces the dimension $b$ in Fig. 3 will be uniform along the radial length of the conductors 6, whereas the dimension $a$ will not. Accordingly $a$ diminishes along the radial length of the conductor 6, and somewhat more than proportionately with decreasing radius from the pattern center. Hence the dimension $a+b$ also diminishes with decreasing radius. A value for $a$ intermediate its extreme values has been found to give good results in suppressing harmonics of the order $d$.

It is apparent that in a winding of the type illustrated in Fig. 1 the current flows not only back and forth in successive radial directions, but that it flows in a circle about the disk. Accordingly two members of the type illustrated in Fig. 1 when assembled into a transformer as indicated in Fig. 7 will exhibit an inductive coupling which is made up not only of the cyclically varying couplings between each radial conductor of one member and the instantaneously adjacent radial conductor of the other but also a coupling similar to that which would exist between two closely spaced coaxial single loop conductors. To the extent that, as is desired in the invention, end effects at the terminal conductors 6' and 6" of the single winding of Fig. 1 and at the leads 7 (Fig. 2) are in such a transformer suppressed, this coupling due to circumferential current flow is independent of the relative angular position of the transformer members. Accordingly the total coupling, i. e. the ratio of secondary volts to primary amperes, instead of varying symmetrically and cyclically (even if non-sinusoidally) about a zero axis varies in a non-symmetrical fashion about zero due to a constant increment of coupling. This falsifies the apparent coupling values and hence the inferences concerning relative angular position of the transformer members drawn therefrom.

According to another feature of the invention this one-turn loop increment of coupling may be suppressed by dividing the winding of one of the transformer members (assuming for the moment in other respects a transformer including two members according to Fig. 1) into a plurality of sectors so that in one or more sectors of that member the circumferential flow of current is clockwise while in one or more other sectors the circumferential flow of current is counterclockwise, the sectors of clockwise flow subtending at the disk center the same angle as do the sectors in which the circumferential current flow is counterclockwise. While the direction of flow will be everywhere reversed twice in each time cycle of the energizing signal applied to the primary member of the transformer, it is nonetheless suitable to refer to clockwise and counterclockwise current flows.

A transformer member according to Fig. 1 may be modified thus to cancel one-turn loop coupling in a transformer including another member according to Fig. 1 by dividing the winding thereof into two halves each covering substantially 180° of the disk face, and by locating one half of the winding in a position 180° of the pole cycle displaced from the position which it occupies in Fig. 1. By properly connecting in series the two halves of the winding thus located, the circumferential flow of current in one half can then be made clockwise with the circumferential flow in the other half counterclockwise, the flow in alternate conductors over the entire disk face being in the same radial directions as before. This arrangement is illustrated in Fig. 4. In Fig. 4 a disk 18 bears a first winding generally indicated at 20 including fifty-four series-connected radial conductors 22 successively 3⅓° apart and a second winding section generally indicated at 24 including likewise fifty-four series-connected radial conductors 26 successively 3⅓° apart. The first conductor $22_1$ of winding 20 is spaced, on centers, exactly 3⅓° from the first conductor $26_1$ of the winding 24, and the last conductor $22_2$ of winding 20 is similarly 3⅓° from the last conductor $26_2$ of winding 24. A lead 36 which, though shown diagrammatically in Fig. 4, may pass over the back face of the disk 18, connects the radially outer end of the last conductor $22_2$ of winding 20 with the radially inner end of the first conductor $26_1$ of winding 24.

Windings 22 and 24 are thus connected into a single series winding of one hundred and eight radial conductors occupying 360° of the disk face, with circumferential current flow in one direction over one half of the disk face and in the opposite direction over the other half of the disk face. One terminal of the resulting winding is at the radially outer end of the conductor $22_1$ and the other terminal is at the radially inner end of conductor $26_2$.

The coupling wave in transformers of the general type illustrated in Fig. 7 can be falsified not only by a coupling which is independent of relative angular position over the complete range of relative positions but by increments which exist over a number of adjacent conductor cycles. Thus if either or both of the disk faces depart from perpendicularity to the axis of relative rotation of the two disks, the spacing between the two disks and hence between the coupled windings will vary about the disk faces, being at one angular position, a minimum at the opposite position, and of intermediate values at positions 90° displaced from the first. Since variation of coupling with axial spacing of the windings is non-linear, these effects are not self-compensating, and it is desirable to subdivide even a single continuous winding into more than two portions of opposite circumferential current flow. Such a construction will be described in connection with Fig. 5, which however illustrates still other features according to the invention.

Figure 5:
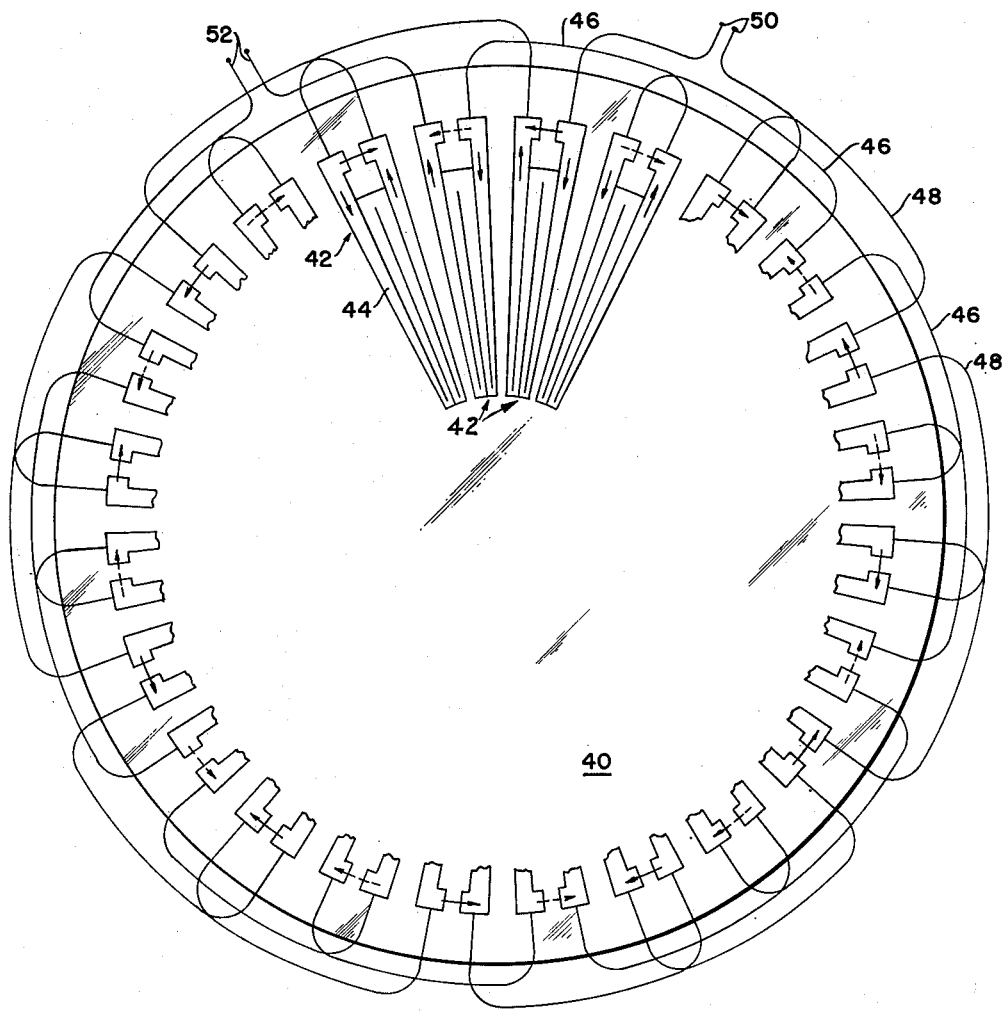
Fig. 5 is a plan view of another form of multipolar rotary transformer member according to the invention, including winding elements (shown diagrammatically) combinable into two windings in space quadrature with respect to the poles of a member of the type shown in Fig. 1.

While the features of the invention thus far described are useful in the provision of transformers both of whose members carry a single winding, applicants' invention comprises additional features which find application primarily in transformers including phase displaced windings on at least one member. A transformer member according to the invention including two windings in space quadrature is illustrated in Fig. 5, the member of Fig. 5 being combinable with a member of the type illustrated in Fig. 1 into a complete transformer the general appearance of which is illustrated in Fig. 7. For purposes of description it is convenient to consider in such a transformer the member of Fig. 1 as the primary or rotor and the member of Fig. 5 as the secondary or stator. The transformer member of Fig. 5 includes a disk 40 which may be similar to the disk 2 of Fig. 1. Laid down on the disk 40 are a plurality of conductor groups or sectors generally indicated at 42, each including a plurality of series-connected radial conductors 44. The showing of Fig. 5 is diagrammatic in that the spaces between adjacent radial conductors 44 are shown as lines rather than as spaces of discrete width. Harmonic compensation according to the principles described in connection with Fig. 3 may, however, be incorporated into members of the type illustrated in Fig. 5.

In the member of Fig. 5 there are twenty-four conductor groups 42, equiangularly spaced from each other. Each group includes four series-connected radial conductors 44. In use, alternate groups are connected together in series by means of external leads, diagrammatically indicated at 46 and 48, to produce two windings of twelve sectors each in space quadrature of the pole cycle of the member of Fig. 1. The two windings formed in Fig. 5 by leads 46 and 48 have terminals indicated at 50 and 52 respectively. The interconnection by leads 46 and 48 of the sectors of the two windings is made in accordance with the principles discussed in connection with Fig. 4 in such a manner that in each of the resulting windings the direction of circumferential current flow is reversed in successive sectors of that winding, as indicated in Fig. 5 by the arrows shown in full lines for the winding having terminals 50 and in dashed lines for the winding having terminals 52.

In Fig. 5, the two windings, each of twelve sectors or sectoral sections, together occupy substantially the entire disk face. While this is not necessary, it is advantageous in view of the low inductive coupling factors which must be reckoned with. For the same reason, it is advantageous, particularly in embodiments of the invention for the measurement of angles, to provide at least approximately the same number of poles on both transformer members in order that all conductors may at all times contribute to the output voltage or voltages obtained. It is to be noted however that the member of Fig. 5 includes ninety-six poles, whereas the member of Fig. 1 with which it is to be used includes one hundred and eight poles. These numbers are both of the order of magnitude of one hundred. It is a feature of the transformers of applicants' invention in preferred embodiments thereof that the number of series-connected inductively coupled conductors is of this order of magnitude. This order of magnitude represents an optimum for obtainable accuracy.

While the obtainable accuracy for position determination would appear to be directly proportional to the number of poles in 360° of the disk face (in embodiments for measurement of angle covering a complete circle) or to the number of poles in a given linear interval (in embodiments for linear position determination) actually an increase without limit in the number of poles contributing to the output voltage adversely affects attainable accuracy. This is due to the fact that capacitive coupling between the two transformer members increases more rapidly than does inductive coupling. The ratio of the stray capacitive coupling to the desired inductive coupling is approximately proportional to the fourth power of the number of coupled poles. In view of this exponential relation, there appears a number of poles beyond which accuracy will be lost by the masking of the inductive component by the capacitive component.

In the embodiment of Fig. 5, as in that of Fig. 4, the sections connected together in series are spaced, on centers, by an integral number of poles of the primary member according to Fig. 1 so that by a proper ordering of the sense of their series interconnections the voltages induced in the radial conductors of all sectors in each winding are in series-aiding relation. Such a spacing amounts to an integral number of halves of the primary pole cycle. Preferably, as in Fig. 5, this spacing of alternate sectors is by an odd integral number of primary poles and therefore by an odd integral number of halves of the primary pole cycle in order to effect successive reversals of the sense of circumferential current flow in the sectors so connected together. This will be understood if it is considered that with alternate sectors (i. e. sectors separated by a third sector) spaced by an odd number of primary poles, the radial direction of current flow induced in, for example, the extreme clockwise conductors 44 of those two sectors will be opposite. Thus, in the member of Fig. 5, designed for use with the member of Fig. 1 in which the pole spacing is 3⅓° and the pole cycle 6⅔°, the spacing of alternate sectors 42 is 30°, which amounts to nine poles or 4½ pole cycles of the primary member according to Fig. 1.

Adjacent sectors in the member of Fig. 5 which belong to the separate windings of that member are spaced on centers by an integral number of primary poles plus one-half of a primary pole, in order to satisfy the relation of space quadrature, it being remembered that one-half of a primary pole is ¼ of the primary pole cycle. Specifically, in Fig. 5, the angular spacing on centers of adjacent sectors is 15°, amounting to 4½ poles or 2¼ pole cycles of the primary member of Fig. 1.

In order to have on the two-winding member of the type illustrated in Fig. 5 an even spacing of the groups or sections of the two quadrature windings, as is advantageous, applicants provide on the single winding member according to Fig. 1 a minimum number of poles N given by a relation $N=2^e \cdot f$ wherein $e$ is an integer and wherein $f$ is an integer not containing any factor of 2. If this relation is satisfied by the primary member, $2^{e+1}$ is the minimum number of sectors or groups which may be provided on a secondary member according to Fig. 5 if those sectors are to be equiangularly spaced. To satisfy this arrangement the number of poles N in the primary member preferably contains as factors 2 to a small power $e$ (of the order of two or three), and a larger number $f$ incommensurable with 2. For example, with N equal to 108, the relation $N=2^e \cdot f$ gives to $e$ a value of 2 and to $f$ a value of 27. Hence, for equal spacing thereof, $2^{2+1}$ or eight is the minimum total number of sections which may be provided in a two-winding member of the type illustrated in Fig. 5 for use with a continuous winding member of the type illustrated in Fig. 1 having one hundred and eight poles. If a larger number of sections is desired, this minimum number $(2^{e+1})$ may be multiplied by any integral factor $f'$ of $f$. The member illustrated in Fig. 5 satisfies this criterion since it includes twenty-four sections and $f'=3$ which is an integral factor of 27. Transformers including a 108-pole primary and a two-winding secondary having four evenly spaced sections per winding may also be constructed in accordance with the invention by giving to each section of each secondary winding fourteen poles and by fitting the poles of each such group or section into the angle subtended on the primary by 14 minus ⅔ or 13⅓ poles of the primary, this fitting effecting suppression of the third harmonic in the coupling wave in accordance with the feature of the invention next to be described.

To effect cancellation of undesired harmonics in the coupling waves between either of the windings of the member of Fig. 5 and the single winding member of Fig. 1, the transformer member illustrated in Fig. 5 incorporates another feature of the invention according to which the pitch of the poles of the two transformer members differ by a slight but closely specified amount.

In transformers according to the invention one member includes a winding which is continuous, or effectively continuous, throughout the range of positions to be measured or determined, and this continuous winding is made up of uniformly spaced poles which establish the repeating cycle within any one of which the relative position of the two transformer members is to be determined essentially by comparison of the magnitude of the secondary voltage with the primary or exciting voltage, whichever member is used for primary and whichever for secondary. The other member may include a single continuous winding as in the case of a transformer including two members of the type illustrated in Fig. 1; or it may include in each of its windings, if more than one are provided, one or more sectors or groups of active conductors each of which includes a substantially smaller number of poles than does the winding of the first member. According to the feature of applicants' invention now under consideration a selected harmonic may be suppressed in the total or cumulative coupling wave between the member having the continuous winding (for convenience assumed to be the primary) and each of the secondary windings (here understood to mean on the secondary member each totality of series-connected active conductors) by altering the conductor or pole pitch within the groups of secondary conductors with respect to the pitch of the primary poles in such a fashion that for any relative position of the primary and secondary windings, the phase of the individual coupling waves between each pole of the secondary and the pole of the primary with which it is inductively coupled shifts from secondary pole to adjacent secondary pole, the number of secondary poles so connected together in each group and the phase shift from pole to pole being such that the phases of the individual coupling waves are uniformly distributed over one or more integral cycles of the harmonic coupling wave sought to be suppressed. This may be effected either by increasing the pitch of the secondary with respect to the primary or by decreasing it with respect thereto.

Figure 6:
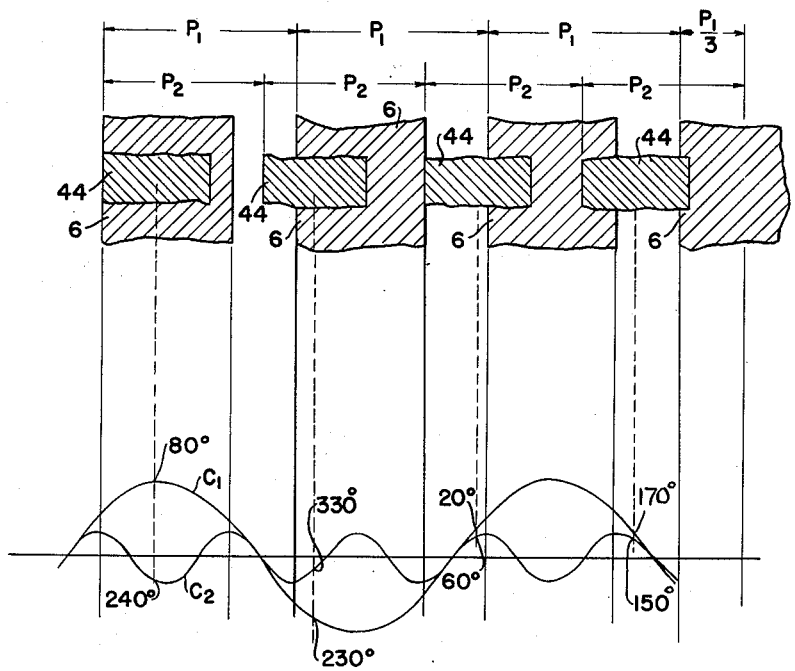
Fig. 6 is a diagram illustrating certain features incorporated into a transformer according to the invention comprising a member of the type illustrated in Fig. 1 and a member of the type illustrated in Fig. 5.

The transformer member according to Fig. 5 incorporates this form of harmonic suppression, the details of such suppression being illustrated in Fig. 6 wherein the four conductors 44 of a single sector 42 of Fig. 5 are fragmentarily illustrated in a given relative position with respect to the adjacent conductors of a transformer member according to Fig. 1, the two members being assumed to be coaxially mounted as indicated in Fig. 7.

According to the features of the invention now under consideration, the pitch of the poles in the secondary or discontinuous winding is established to differ from the pitch of the poles of the continuous or primary winding in such a fashion that a given number of uniformly spaced secondary poles within which as a unit harmonic compensation of a particular order is to be suppressed and comprising for example a sector of the type indicated at 42 in Fig. 5 occupies a space or subtends an angle equal to the space or angle occupied by the same number of poles on the primary plus or minus two divided by the order of the harmonic to be suppressed. Alternatively stated, the number of uniformly spaced secondary poles within which suppression of a given harmonic in the coupling wave is to be achieved occupy a space or angle equal to the space or angle occupied by the same number of primary poles plus or minus the fraction of the pole cycle on the primary (including two primary poles) which is equal to the reciprocal of the order of harmonics in question. The member of Fig. 5 illustrates a design in which the third harmonic in the coupling wave between the member of that figure and a member according to Fig. 1 is suppressed by this method, suppression being effected within each sector of the secondary member of Fig. 5. The four poles of each such sector subtend at the center of the disk 40 an angle equal to the angle subtended at the center of the disk 2 in Fig. 1 by 4 minus ⅔ equals 3⅓ primary poles. This relation is illustrated in Fig. 6 where three and a fraction series-connected primary conductors 6 are shown fragmentarily in relation with four series-connected secondary conductors 44, the radial dimensions of the conductors being vertical in the figure and the radial taper of the conductors being ignored. Both primary and secondary members are shown in Fig. 6 as designed for separate suppression of the third harmonic in accordance with the principles described in connection with Fig. 3, the circumferential extent of the conductors being in both cases ⅔ of the circumferential extent of a single pole comprising a conductor and its adjacent space.

In accordance with the feature of the invention presently under consideration, for suppression of a harmonic of order $m$ (3d order in Fig. 5), a number $n$ of secondary poles (four in Fig. 5) each comprising a conductor 44 of width $a'$ and its associated space of width $b'$, the combined width of which constitutes a uniform pitch $p_2$, occupy the same space in the direction of relative movement of the conductors and therefore subtend at the center of the disks the same angle as do $n \pm 2/m = 4 \pm ⅔$ or, in Fig. 5, 3⅓ primary poles each comprising a conductor 6 of width $a$ and its associated space $b$, the combined width of which constitutes a uniform pitch $p_1$. Assuming the conductors 6 to be energized with an alternating voltage, the magnetic coupling of conductors 6 to one of the conductors 44 in the adjacent plane is indicated in Fig. 6 by means of a sinusoidal curve $C_1$ which has its positive and negative maxima when the conductor 44 is opposite the center of the successive conductors 6 and which passes through zero at positions half-way between. This curve represents the fundamental component of the coupling wave, i. e. the relative amplitude of the voltage which would be induced by primary conductors 6 in a secondary conductor 44 as a function of the position of that conductor transversely of the successive primary conductors 6. Curve $C_2$ in Fig. 6 represents the relative amplitude of the third harmonic component of the coupling wave similarly defined. The cycle of the fundamental coupling wave is seen to be the pole cycle of the primary, i. e. $2p_1$. The ordinates on the curves $C_1$ and $C_2$ thus represent the amplitudes of the fundamental and third harmonic components of the coupling wave, though not necessarily to the same scale of ordinates. The actual coupling wave may of course include harmonic components of other orders. With a zero phase reference where the curves $C_1$ and $C_2$ cross the axis for the first time at the left side of the figure and with the left-hand edge of the leftmost conductor 44 of a secondary group aligned with the lefthand edge of a conductor 6 as shown, the phases of the fundamental coupling wave at which conductors 44 couple with the fields of the primary conductors 6 shown are respectively 80°, 230°, 20° and 170° respectively of the fundamental coupling wave $C_1$ and 240°, 330°, 60° and 150° of the third harmonic coupling wave. This may be more readily understood from the figure if the secondary conductors are considered to be of zero width concentrated at their center bearings. The total voltage collected at the terminals of the series connection comprising the four conductors 44 shown will therefore include a fundamental component which is the sum of the ordinates on $C_1$ at phases 80°, 230° 20° and 170°, and a third harmonic component which is the sum of the ordinates on $C_2$ at phases 240°, 330°, 60° and 150°. Since the phases of the four ordinates on the third harmonic coupling wave are successively separated by 90° of the third harmonic cycle, their sum will be equal to zero. Hence the third harmonic of the coupling wave will be suppressed.

Transformers as generally illustrated in Fig. 7 including a continuous winding of the type illustrated in Fig. 1 and a space quadrature two-winding member of the type illustrated in Fig. 5 may be employed, when combined with a suitable coarse data system, for the repetition of shaft positions with a high degree of accuracy. In such an arrangement a member according to Fig. 1 may be provided at a transmitting station, mechanically coupled to the shaft whose position is to be remotely indicated and energized by an A. C. voltage of appropriate frequency which may be of the order of 10 kc. At the transmitter therefore the member according to Fig. 1 is the primary of the transformer. It is also made the rotor in view of the smaller number of external leads required therefor. The voltages induced in the two windings of the transmitter secondary member according to Fig. 5, mounted as a stator, are then passed through suitable matched amplifiers for energization of the two windings of another member according to Fig. 5 provided at the receiving station where the shaft position is to be repeated. At the receiver a member according to Fig. 1, again conveniently mounted as a rotor, is connected to supply the voltage induced in its single winding to a servomechanism. In this servomechanism the receiver rotor voltage may be compared with the energizing voltage may be compared with the energizing voltage at the transmitter. The sign of the receiver rotor voltage determines the sense in which the servo drives the receiver until the receiver rotor voltage goes to zero. When this voltage goes to zero, and assuming a correct coarse positioning, the relative positions of the rotor and stator members at the two stations will be the same except for a difference of one quarter of a pole cycle, due to the fact that the receiver transformer is being driven to a null of induced voltage instead of to a maximum. In such a system, if shaft position is to be reproduced without multiplication, the pole cycle of the continuous winding members of the two transformers should be the same.

Figure 8:
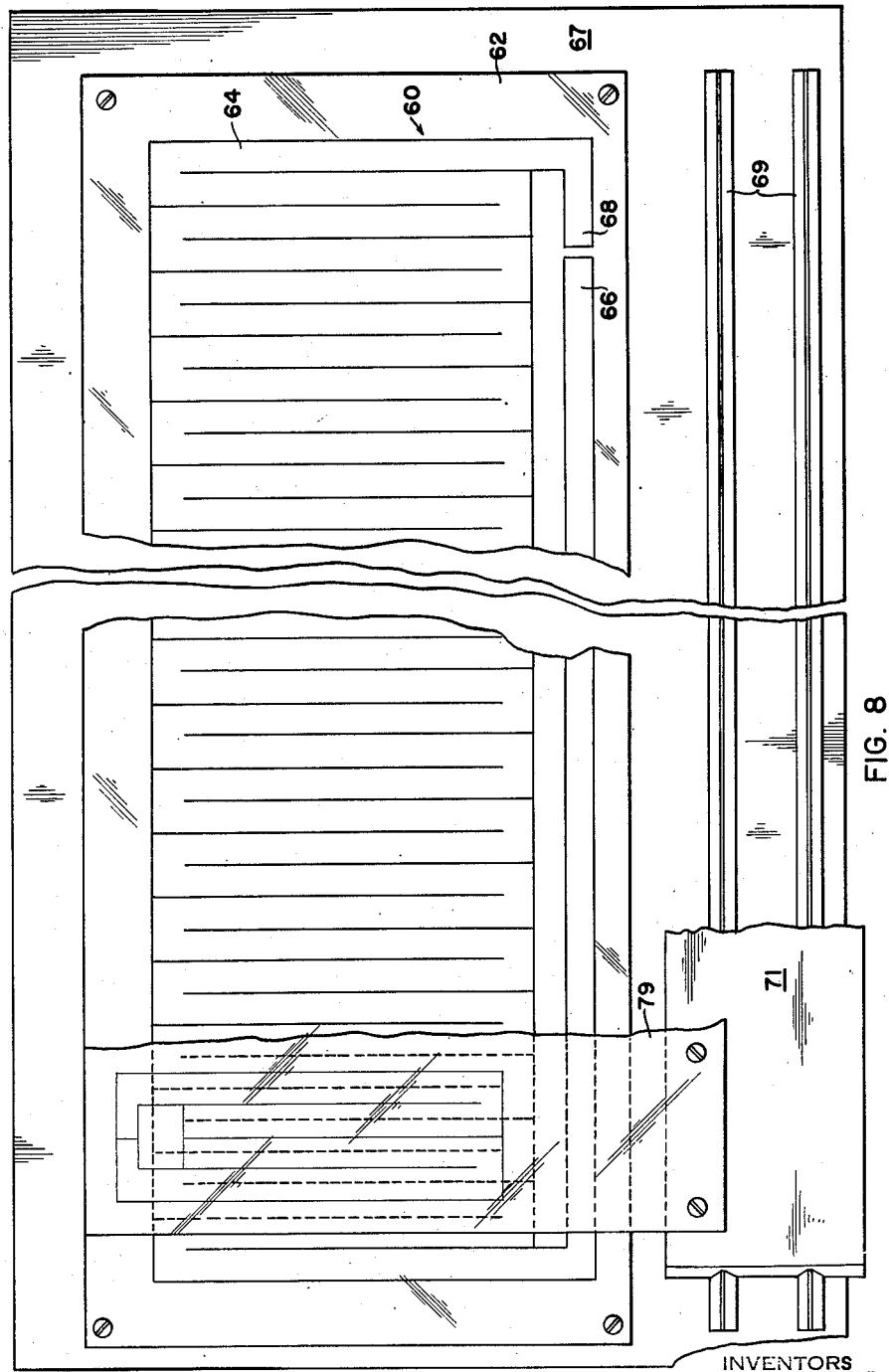
Fig. 8 is a plan diagrammatic view of one member of a linear transformer according to the invention including a single continuous winding, and showing fragmentarily in association therewith a transformer member of the type illustrated in Fig. 9 for the formation of a complete transformer for the measurement of linear position.
Figure 9:
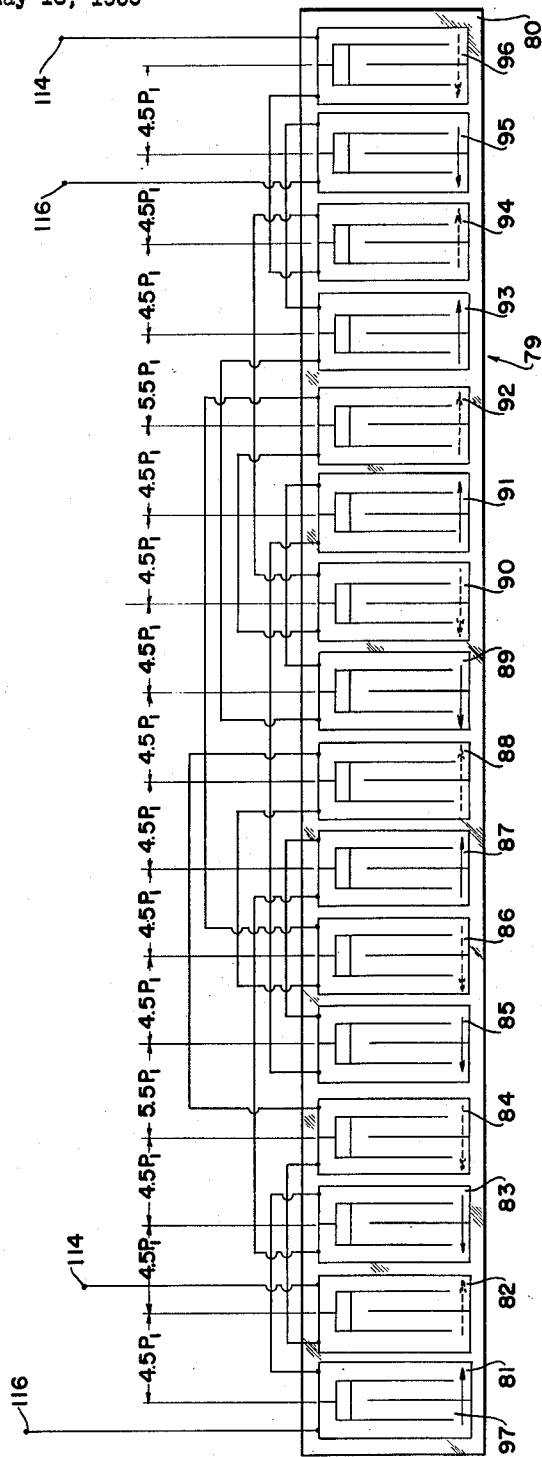
Fig. 9 is a plan diagrammatic view of a linear transformer member according to the invention incorporating two windings in space quadrature.

The various features of the invention which have been described may be embodied in transformers for linear position determination as well as in transformers intended for angular position determination. An embodiment of the invention intended for linear position determination is illustrated in Figs. 8 and 9. Fig. 8 is a representation, diagrammatic in the same manner as Fig. 5, of a multipolar winding generally indicated at 60, supported on a glass plate 62 and comprising a multiplicity of identical series-connected conductors 64 arranged parallel to each other at equal spacings in an array extending transversely of the length of the conductors. Conducting strips 66 and 68 connected to the extreme conductors 64 may be provided to permit leads to be attached in a manner similar to that described in conjunction with Fig. 2. In a completed transformer a member according to Fig. 8 is supported with its winding parallel to and at a constant separation from the winding of a two-winding member of the type illustrated in Fig. 9. A winding of the type illustrated in Fig. 8, which may be of any desired length, or which may include a plurality of members appropriately positioned and connected for successive use, may for example be affixed to the bed of a machine tool diagrammatically indicated at 67 and having ways 69. Such a winding, generally indicated at 70, may be employed with a winding of the form illustrated in Fig. 9, the latter being fixed to a carriage 71 which rides on ways 69 for location of the carriage at a specified position within any one cycle of the winding of Fig. 8 along the bed by measurement of the proportions of voltage induced between the movable and fixed windings. A fragment of the member 79 of Fig. 9 is shown in Fig. 8, thus supported with respect to the member 62. The two transformer members are thus supported with their active conductors parallel, for relative motion transversely of those conductors.

Harmonic compensation according to the method described in conjunction with Fig. 3 may be incorporated into either or both of the transformer members illustrated in Figs. 8 and 9, and if incorporated in both it may be used on the two members for compensation of the same or different harmonics.

The winding of Fig. 8 constitutes the continuous winding of the linear transformer; the windings of Fig. 9 are discontinuous windings made up of groups of conductors disposed in a manner analogous to that illustrated in Fig. 5 for a rotary transformer. Thus the winding of Fig. 9 includes two discontinuous windings in space quadrature with each other. As applied to the positioning of the carriage of a machine tool as outlined above, the two windings of Fig. 9 are energized with A. C. voltages whose amplitudes are related as the sine and cosine of the space phase in the pole cycle of the member of Fig. 8 to which the carriage is to be moved. When the carriage is moved (within the pole cycle selected by a coarse positioning mechanism) to the position corresponding to this space phase, the sum of the voltages induced by the windings of Fig. 9 in the winding of Fig. 8 will be zero. Servomechanism operating upon the error signal induced in Fig. 8 prior to arrival of the carriage at that position is employed to drive the carriage until the output or error signal from the winding of Fig. 8 reaches zero.

The two-winding secondary member of Fig. 9 includes a glass plate 80 having a smooth plane face and sixteen conductor sections generally indicated at 81—96. Each of the sections 81—96 includes four conductors 97, and the pitch of the poles which they form with their adjacent spaces may be altered with respect to the pitch of the poles of conductors 64 of Fig. 8 in order to effect harmonic compensation in the manner described in conjunction with Fig. 5. The spacing on centers of alternate sections in Fig. 9 is, with exceptions presently to be noted, an odd integral number of poles of the member of Fig. 8, in a fashion similar to that described with reference to the center-to-center spacing of the sections in Fig. 5. The spacing on centers of adjacent sections in Fig. 9 is likewise an odd number of halves of this primary pole pitch. For reasons which will presently be stated however neither of these center-to-center spacings in Fig. 9 is constant for all sectors.

Alternate of the sections 81—96 are connected in series by means of the leads shown to form two windings each including eight sections. The terminals of one of these windings are indicated at 114 and the terminals of the other at 116. The interconnection is so effected that in each half of the complete member shown, these halves comprising respectively sections 81—88 and sections 89—96, each winding includes two sections in which the sense of current flow parallel to the long dimension of the plate 80 is in one direction and two sections in which the sense of current flow parallel to the long dimensions of the plate 80 is in the opposite direction. This is indicated in Fig. 9 by arrows in full lines for the winding having terminals 116 and by arrows in dashed lines for the winding having terminals 114. The positioning of the four sections in each half of each of the windings 114 and 116 with respect to each other and the distribution among them of direction of current flow lengthwise of the member are selected in accordance with criteria best understood by reference to Fig. 10. In Fig. 10 the sections 81—88 of one half of the member of Fig. 9 are indicated by similarly numbered rectangles bearing arrows indicative of the relative sense of current flow within each group of four sections connected together in series according to the convention adopted with respect to Fig. 9. Since in the interlaced halves of the windings 114 and 116 shown in Fig. 10 there are two sections for current flow to the left and two sectors for current flow to the right, these flows of current lengthwise of the member, analogous in their effects to the one-turn loop coupling discussed in connection with Figs. 4 and 5 will balance out, assuming parallelism between the planes of members of Figs. 8 and 9 in the assembled transformer. The same may be said of the other halves of the windings 114 and 116, not illustrated in Fig. 10. In Fig. 9 sections 89—96 form a structure which is a mirror image of the structure comprising sections 81—88, the plane of symmetry being a plane perpendicular to the plane of the plate 80 and passing between the sections 88 and 89.

In Fig. 10 the interconnections of the sections have been omitted for clarity. The rectangles representative of sections 81—88 are however shown aligned along one edge with a line 118 intended to represent the plane of the plate 80 of Fig. 9. A line 120 inclined to the line 118 is intended to represent the plane of the plate 62 of the continuous winding according to Fig. 8, the two planes being assumed to be perpendicular to the plane of Fig. 10. This inclination represents an assumed departure from parallelism of the two transformer members resulting from imperfections of their respective supports. This departure from parallelism will vary with the relative position of the transformer members lengthwise of each other, and the member of Fig. 9 is designed according to the invention to compensate therefor.

Considering for the moment the winding 114, whose sections are identifiable in Fig. 10 by the dashed representation of the arrows thereon, the section 84 may be assumed to lie at a standard or intended distance from the plane 120 of the primary transformer member. Accordingly the deviation in the separation of the transformer members at the position of the section 84 is identified in the drawing by the figure zero adjacent section 84 between planes 118 and 120. The spacing between planes 118 and 120 at section 82 is less than the standard amount and a deviation of −1 may be arbitrarily assigned thereto. In accordance with this the deviation between planes 118 and 120 at the position of sector 86 is +1 and that at the position of section 88 is +2. Assuming that the variation in coupling between sections 81—88 and the winding of Fig. 9 is at least approximately proportional to the deviation in separation between the two transformers from a nominal value, it will be seen that with the interconnection illustrated in Fig. 10 sections 82 and 88 of the widing 114 contribute to falsification of the overall coupling wave by virtue of current flow parallel to the relative motion of the two transformer members a total −1+2=+1 units in one direction and that sections 84 and 86 make a similar contribution of 0+1=1 in the opposite direction. The total contribution accordingly cancels out. Similar considerations apply with respect to sections 81, 83, 85 and 87 of the other winding having terminals 116. In order to permit compensation of current flow lengthwise of the transformer members in accordance with the principles described in conjunction with Fig. 10 the sections must be spaced as indicated in Figs. 9 and 10, wherein $P_1$ represents the pole pitch of the continuous winding with which the member of Fig. 9 is to be used. The series-connected sections are, except in one instance for each of the two half windings shown in Fig. 10, spaced on centers by an odd integral number of multiples of this primary pole pitch and all sections of one winding 114 are spaced center to center from all sections of the other winding having terminals 116 by an odd number of multiples of one half this pole pitch. The spacing is however not uniform. In order to achieve the order of current flows parallel to the long dimension of the member of Fig. 9, which permits the compensation illustrated in Fig. 10, the series-connected sections 84 and 86 are spaced by one more primary pole pitch than are the similarly series-connected sections 82 and 84. Sections 84 and 86 are hence spaced by an even number of multiples of the pole pitch $P_1$. Similarly in the other winding, sections 83 and 85 are given the same sense of current flow lengthwise of the transformer member by spacing them by one more primary pole pitch than are spaced the sections 81 and 83 which have opposite directions of current flow lengthwise of the member. Sections 83 and 85 are hence spaced by an even number of multiples of the pole pitch $P_1$.

Figure 11:
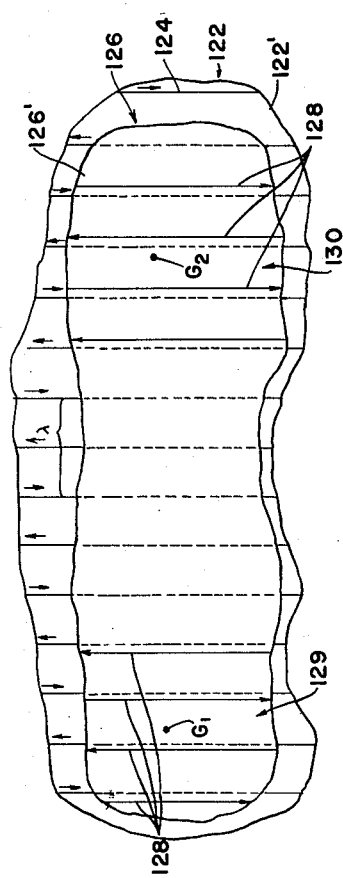

Fig. 11 illustrates schematically and in fragmentary fashion the two members 122 and 126 of a transformer according to the invention in which a supplementary means for cancellation of harmonics are provided. In Fig. 11 the reference character 122' identifies the supporting glass plate for one transformer member 122, carrying a multiplicity of uniformly spaced conductors 124. Member 122 is therefore the continuous winding member of the transformer. The conductors 124, like all the conductors shown in Figs. 11–14, are indicated as geometrical lines; they have of course a finite width which may be proportioned to the spaces between them in accordance with the principles discussed hereinabove in connection with Fig. 3. The conductors 124 are connected in series by leads or winding portions not shown so that adjacent of these conductors carry current in opposite directions, as indicated in the figure by the short arrows parallel thereto. Reference character 126 indicates the other transformer member including a glass plate 126' mounted by appropriate mechanism not shown with its face parallel to the face of member 122 for motion transversely of the conductors 124. The member 126 carries a multiplicity of conductors 128, of which eight are shown divided into two groups or sections 129 and 130 of four conductors each, the conductors 128 of each group being uniformly spaced.

Figure 13:
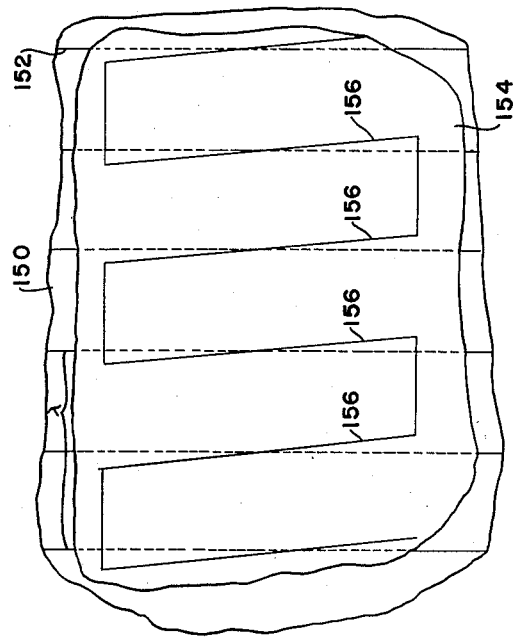
Figs. 11–13 are fragmentary diagrammatic views of other transformers according to the invention.
Figure 12:
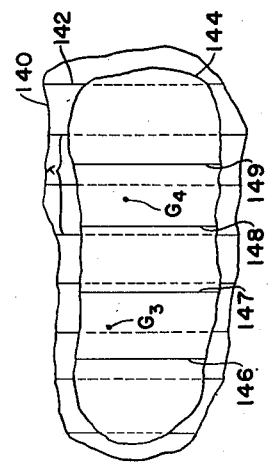

Each of Figs. 11–13 is intended to represent alternatively a linear or a rotary transformer in accordance with the invention. In these figures, if a linear transformer is involved, all conductors on each member are parallel to each other. If a rotary transformer is involved, all conductors on each member are radial of the axis of rotation of the transformer; or at least they are all tangent to a common circle, if harmonic compensation is additionally applied according to the principles yet to be discussed in connection with Fig. 13. In the transformer thus illustrated in each of Figs. 11–13 means are provided, as in the transformer of Fig. 8, to support the two transformer members for relative motion in a direction transverse to the length of the inductively coupled conductors shown.

On the member 126 of Fig. 11, for convenience referred to as the secondary, the eight conductors 128 shown are connected in series by leads or conductors not shown so that within each group of four, adjacent conductors carry current in opposite directions. Each pair of groups like the two groups 129 and 130 are interconnected in the manner described in conjunction with Fig. 5 whereby the adjacent conductors of the two groups carry current in radially similar directions. Consistently with this interconnection of the two groups of secondary conductors 128, the two groups 129 and 130 are spaced on centers by an interval which, to a first approximation, is an odd integral number $g$ of halves of the pole cycle of the continuous winding member 122, this pole cycle being indicated in the figure by the reference character $\lambda$. In accordance with the feature of the invention now under consideration however, the two groups of secondary conductors are spaced on centers by an interval which differs from an odd integral number of halves of the primary pole cycle by an odd number $h$ of halves of the fraction of the primary pole cycle which is the reciprocal of the order of the harmonic to be suppressed in accordance with this displacement.

Let it be assumed that Fig. 11 illustrates third harmonic compensation. If $G_1$ and $G_2$ represent, with respect to the dimension of the groups of secondary conductors parallel to the direction of relative motion of the two transformers, i. e. in practice the dimension perpendicular to the conductors 124 and 128, the centers of gravity of the lefthand and righthand groups of conductors 128, then $G_1$ is displaced $\lambda/12$ to the left from a nominal position and $G_2$ is displaced to the right by $\lambda/12$ from a nominal position. On the discontinuous winding member 126 the two groups 129 and 130 of conductors 128 shown are thus spaced on centers by an interval amounting to an odd number ($g=9$) of halves of the pole cycle of the primary member, plus one sixth of that cycle or one third of one half of that cycle, i. e. by $g+h/i$ halves of the pole cycle $\lambda$, wherein $g$, an integer (made odd for cancellation of one-turn loop coupling) is 9; wherein $h$, an odd integer, is 1; and wherein $i$, an integer, is 3 for cancellation of third harmonic. The two secondary sections 129 and 130 identified by their centers of gravity $G_1$ and $G_2$ therefore differ in their phase relation to the primary member by one sixth of the primary pole cycle, i. e. by one half of the third harmonic of the fundamental component of the coupling wave which is cyclical in the interval $\lambda$. The result is that over the two series-connected winding sections 129 and 130 there is effected cancellation of the third harmonic in the transformer coupling wave. The complete transformer of course includes more than the two groups 129 and 130 of secondary conductors shown, other pairs of adjacent groups being spaced in the same manner.

Within the sections 129 and 130 the separate conductors 128 may be spread apart or contracted together to have a center to center spacing differing from $\lambda/2$ for cancellation of the same or of some other harmonic in accordance with the principles described in connection with Fig. 5.

Fig. 12 illustrates still another form of transformer according to the invention, which may be of either the linear or rotary type. A continuous winding member 140, conveniently referred to as the primary and having thereon a winding including uniformly spaced series-connected conductors 142 is supported by means not shown with its plane face adjacent and parallel to the plane face of a discontinuous winding member identified at the reference character 144 which bears a multiplicity of series-connected conductors. The secondary conductors are arranged in sections of four conductors each. One such four-conductor section of a secondary winding is shown in Fig. 12 on the member 144. The four conductors of each section are spaced in a manner to provide within this section cancellation of two harmonics. To this end, the four conductors 146 to 149 of the secondary section shown in the figure are divided into two halves of two conductors each, the two halves being so disposed that the separation of their centers of gravity $G_3$ and $G_4$, defined in the sense of the centers of gravity $G_1$ and $G_2$ in Fig. 11, differs from an integral number of cycles $\lambda$ of the continuous winding member 140 by one-half of the fraction of $\lambda$ corresponding to one harmonic. Further the two halves (i. e. single conductors) of each half are spread or brought together with respect to the center of gravity of that half by the fraction of $\lambda$ corresponding to half of another harmonic. For example, the lefthand conductor 146 may be advanced to the left by 48° of the primary pole cycle $\lambda$ and the adjacent conductor 147 is similarly advanced by 12° while conductors 148 and 149 respectively lag by 12° and 48° the positions which they would occupy if all four were spaced at uniform intervals of $\lambda/2$. This is equivalent to a displacement of the conductor pair 146, 147 to the left by $\lambda/12$ and of the conductor pair 148, 149 to the right by $\lambda/12$, followed by a spreading of the conductors of each pair to the left and right by $\lambda/20$. The separation of the left and right halves $G_3$ and $G_4$ of the secondary conductor section illustrated in Fig. 12 therefore differs from an integral number of cycles $\lambda$ by the amount $\lambda/6$ to effect cancellation of third harmonic coupling in the combined coupling wave between the primary winding and the secondary section illustrated. Moreover the separation of the left and right halves of each of the section halves $G_3$ and $G_4$ differs from $\lambda/2$ by the amount $\lambda/10$ to effect cancellation of fifth harmonic in the coupling wave between the primary winding and the secondary section illustrated.

Fig. 13 illustrates still another form of transformer according to the invention. In Fig. 13 a primary member fragmentarily illustrated at 150 carries a continuous winding including a multiplicity of uniformly spaced conductors 152, connected in series by means not shown so that adjacent thereof carry current in opposite directions. The conductors 152 may have any desired length. Reference character 154 identifies a secondary member 154, fragmentarily shown, which carries a winding including a multiplicity of series-connected conductors 156. Conductors 156 while uniformly spaced at intervals of $\lambda/2$, measured perpendicularly to the length of conductors 152, are arranged on member 154 so that they are inclined to the adjacent conductors 152 for all relative positions of the two transformer members, and the inclination is so proportioned to the length of conductors 156 that, measured perpendicularly to the length of conductors 152, each of the conductors 156 spans a fraction of the primary pole cycle $\lambda$ equal to an integral number of multiples of the reciprocal of a harmonic selected to be suppressed by this inclination. Otherwise stated, the two ends of each conductor 156 have as the points of nearest approach thereto in the plane of the member 150 points which differ in the phase of the primary pole cycle $\lambda$ by an integral number of multiples of the reciprocal of the harmonic so sought to be suppressed. Suppression results from the fact that in each of the secondary conductors 156 the selected harmonic appears equally in all phases for all relative positions of the transformer members.

Fig. 14 illustrates in diagrammatic form still another transformer member according to the invention which is of the continuous winding type but which includes two windings in space quadrature. In Fig. 14 a glass plate 162 is shown with three continuous multipolar windings generally indicated at 164, 166 and 168. These windings are made up each of a multiplicity of uniformly spaced parallel series-connected conductors, as in the case of the winding 60 of Fig. 8. Windings 164 and 168 are in space quadrature with respect to winding 166. They may be in the same or in opposite space phase with respect to each other, a series-aiding relation between the windings 164 and 168 being obtainable upon a proper series interconnection thereof via lead 170. Preferably the length of the active conductors in winding 166 is approximately twice as great as the length of the active conductors in either of the windings 164 and 168. In this way windings 164 and 168 when connected in series-aiding relationship together form a winding having approximately the same coupling capacity as has the winding 166. By dividing the two phases as shown into three windings the members of Fig. 14 achieves a substantial amount of compensation for lack of parallelism between the member of that figure and a member such as that of Fig. 9, in particular with respect to departures from parallelism in directions parallel to the length of the active conductors. Fig. 14 shows, fragmentarily, a member 172 of the type illustrated in Fig. 9, supported adjacent the member 162 by means not shown to position the windings of the two members in closely spaced parallel planes for relative motion transverse of the conductors of both members. On the member 172 the length of the conductors 174 is substantially equal to the sum of the lengths of the conductors of windings 164, 166 and 168 on member 162.

A transformer as illustrated in Fig. 14, both of whose members include two windings in space quadrature, is suitable for use as a linear differential. Thus, the windings of one member of a transformer of this type can be connected to the output from the quadrature windings of a transformer as illustrated in Fig. 8, energized on its single winding 60, to obtain as a final output from the combination of both transformers an electrical signal representative of the sum of the linear motions of the two transformers.

Figure 15:
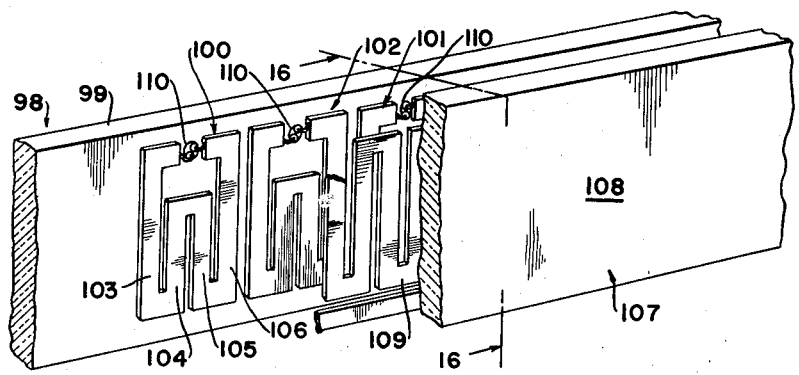
Fig. 15 is a perspective view, partly broken away, of a linear transformer according to the invention.
Figure 16:
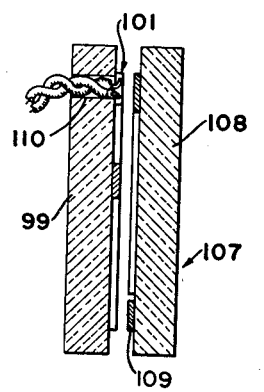
Fig. 16 is a sectional view taken on line 16—16 of Fig. 15.
Figure 17:
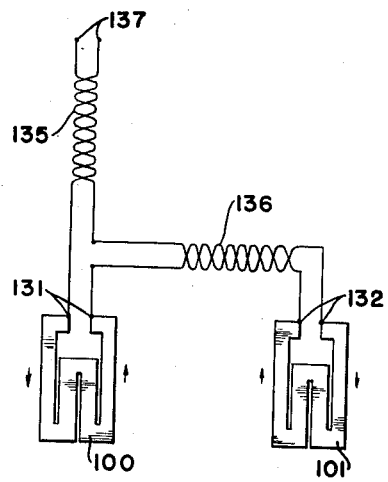
Fig. 17 is a schematic view illustrating the interconnection of two of the conductor groups or sections of a member of the type illustrated in Fig. 9.

Fig. 15 illustrates generally the physical aspect, although not to scale, of the conductors of the continuous and discontinuous winding members of a transformer of the type illustrated diagrammatically in Figs. 8 and 9. For clarity, the thickness of the conductors has been exaggerated in Figs. 15 and 16, and the conductors are not in general self-sustaining as Fig. 15 suggests. Subject to the same limitations, and to the additional limitations concerning the taper of the conductors and/or spaces involved in forming windings into an arcuate pattern, Fig. 15 illustrates in its discontinuous winding member the general physical aspect of the conductor patterns of the discontinuous winding member diagrammatically illustrated in Fig. 5. Figs. 15—17 also illustrate the manner in which the leads to the conductor sections of the discontinuous windings are assembled, the leads being tightly twisted to reduce the effect of stray magnetic fields.

In these figures the member 98 corresponds to the member 79 of Figs. 8 and 9. It comprises a glass plate 99 having two windings in space quadrature of the cycle of the continuous winding member which is generally indicated at 107. Member 107 corresponds to the transformer member fastened to the machine bed 67 of Fig. 8. The continuous winding member 107 establishes the pole cycle within which position is measured by the transformer and therefore may be called the scale or scale member. In certain linear position measuring transformers according to the invention which have been constructed, the pole cycle of the continuous winding member has been 0.1 inch. When fixed, such a continuous winding member constitutes a reference to which the position of the other member 98 may be referred, such a quadrature winding member being therefore sometimes referred to as a slider. In certain embodiments of the invention which have been constructed, the scale member has been of the order of 10 inches in length, and the slider member has been of the order of 5 inches in length, plural scales being combinable to permit measurement of position over greater distances.

In Fig. 15 the scale or stator member 107 comprises a glass plate 108 having a continuous winding 109 as described in conection with Fig. 8.

The quadrature windings of member 98 correspond to the two windings shown in Fig. 9, the conductor groups 100 and 101 being in one of these windings and the alternate groups, of which one is shown at 102, being in the other winding. Each group comprises 4 conductors 103—106. On winding member 98 the plate 99 is pierced with a hole 110 for each conductor group, through which the leads to the conductor groups are brought as illustrated in Fig. 16 where leads are shown tightly twisted together.

The connection together of two conductor groups 100 and 101 of one of the quadrature windings of member 98 is schematically illustrated in Fig. 17. In Fig. 17 the terminals 131 of conductor group 100 and terminals 132 of conductor group 101 are connected together in series by means of twisted leads as indicated at 135 and 136, the outer terminals of the two series-connected groups being indicated at 137. Advantageously the conductor groups of each of the two quadrature windings may be preassembled in pairs as indicated in Fig. 17 to produce for each of the two windings of a transformer member as illustrated in Fig. 9 four sets of terminals 137. These are then connected together to produce the series interconnection of conductor groups schematically shown in Fig. 9.

Both the rotary and linear forms of the invention are very low impedance devices. The impedance ranges from about 1 to 5 ohms for the various devices. The inductances are only a few microhenrys. For this reason the elements act essentially as pure resistances at 10 kc., and the output voltage is about 90 degrees out of phase with the applied voltage. Inputs of the order of 0.2 volt at 10 kc. are usually used. This results in an output voltage having a maximum value of about 0.001 volt. The maximum error corresponds to a few microvolts. The signal-to-noise ratio is quite high, however, because of the low impedance and the relatively narrow band that can be used in the error channels.

It is convenient in most applications to use the transformers of this invention in amplitude-type circuits as hereinabove described. However, when information is to be transmitted over a distance, or recorded on magnetic tape, it is advantageous to use a phase method of operation. According to this method of use, the two windings of the quadrature winding member of the transformer the relative position of whose members is to be recorded or transmitted are excited by voltages of the same frequency and amplitude but displaced from each other 90° in time phase. The resultant voltage induced in the other member will be constant in amplitude and independent of relative transformer member position, but the time phase thereof will be a linear function of that position, angular or linear according as an angular or linear position measuring transformer is used. The information contained in this time phase can be transmitted over short or long distances by wired or wireless means by transmitting a reference voltage (e. g. one of the time quadrature exciting voltages) and the induced secondary voltage on the same system. The time phase difference between the two voltages observed at the receiving station will represent the information on relative transformer member position, and will not be sensitive to the amplitude of the received signals.

The invention has been described herein in terms of preferred embodiments including (e. g. in the case of Figs. 5 and 6) the selection for one or both transformer members of a ratio of conductor width to the sum of conductor width and spacing and (e. g. in the case of Figs. 5, 6, 8, 9, 11 and 12) the division of the conductors of one of two inductively coupled primary and secondary windings into groups within which (e. g. in the case of Figs. 5, 6, 8, 9 and 12) a pitch is used different from the conductor pitch of the other winding, the groups being (e. g. in the case of Figs. 11 and 12) positioned out of phase with each other with respect to the other winding. These preferred embodiments also include (e. g. in the case of Figs. 5, 6, 8, 9 and 11) the division of one of the two inductively coupled windings into a plurality of groups or sections such that the current flow transverse of the side-by-side conductors of that winding occurs over distances of substantially equal length in the two opposite directions which are parallel to the direction of relative movement of the transformer members, in rotary embodiments the arrangement of sections being such that series-connected sections are provided at diametrically opposite positions having the same sense of peripheral current flow while additional diametrically opposite sections, both of the opposite sense of circumferential current flow, are disposed 90° from the first pair.

These features coact to minimize harmonic errors in the coupling waves and to minimize errors due to one-turn loop coupling and also those due to wobble and (in rotary embodiments) decentering, these terms referring to departures of the, usually, nominally plane surfaces to which the windings conform from parallelism to their direction of relative motion and to eccentricity of the winding patterns from a common center on their axis of relative rotation. It is of course within the scope of the invention to use conductors set into rather than on their supports as shown in the drawings. Such wobble and decentering are mechanical errors which must be reckoned with if the transformer members and their bearings are to be manufactured to reasonable tolerances. They produce a variation, cyclical for rotary embodiments in a cycle equal to one relative revolution of the transformer members, of the amplitude of the coupling wave and of the amount of relative motion of the transformer members over which the coupling wave will go through one cycle, the latter error being in rotary embodiments analogous to frequency modulation such as might be observed in the coupling wave if the transformer members were rotated with respect to each other at constant angular velocity.

The coaction of these different features makes possible the production of transformers by means of which position measurements may be made with the degree of accuracy potentialy inherent in the small dimensions of the pole cycles employed, while permitting the construction of such transformers with acceptable tolerances both in the shaping and mounting of their supporting members and in the formation of the winding patterns thereon. Thus while the selection of an appropriate ratio of conductor width to the sum of conductor width and spacing might suffice to reduce a given harmonic to a satisfactorily low level, it is difficult economically to control the conductor dimensions and positions to a sufficient degree of accuracy. Moreover in rotary transformers this form of harmonic suppression may be of somewhat reduced effectiveness because the ratio cannot in general be made uniform over the radial length of the conductors. It is therefore desirable to effect harmonic suppression by use of such a ratio together with subdivision of the conductors of one of two inductively coupled windings into groups within which a selected difference is provided between the pitch of the conductors as compared with the pitch of the conductors of the other winding, the grouping of conductors in the one winding advantageously involving also phase displacements between series-connected groups, the subdivision of conductors into groups being further so undertaken, by a spacing of adjacent series-connected groups on intervals which to a first approximation are an odd integral number of halves of the pole cycle of the continuous winding member, as to permit in such conductor groups opposite directions of current flow transversely of the conductors consistently with a series-aiding relation of the voltage in all series-connected conductors. Moreover if the suppression of one-turn loop coupling so undertaken is to be fully effective due regard should be had for the effect on such one-turn loop coupling of wobble and decentering, by use in the subdivided winding of two or more diametrically opposite pairs of sections approximately 90° apart, the two pairs having opposite directions of peripheral current flow but the same direction of peripheral current flow in both sections of each such pair, the aiding sum in one sense of the extreme values of the one-turn loop coupling component in the two sections of one pair due to wobble and/or decentering being balanced by the oppositely aiding sum of the intermediate values of one-turn loop coupling component in the diametrically opposite sections positioned 90° from those of the first pair.

It is thus seen that the subdivision of the conductors into groups which is effective in minimizing one-turn loop coupling and wobble and decentering errors, and analogous errors in the case of linear embodiments as discussed in connection with Fig. 10, also contributes to the reduction of harmonic errors as well and vice versa, correction of both types of errors inhering in common constructional features. Various departures may however be made from the embodiments which have been shown, the scope of the invention being set forth in the appended claims.

We claim:

1. A transformer comprising two relatively movable supports, a first multiplicity of the order of one hundred series-connected strip-like conductors of uniform width $a$ disposed side by side on one of said supports with a uniform spacing $b$ from each other and extending in directions transverse of the direction of relative movement of said supports, a second multiplicity of the order of one hundred similarly extending strip-like conductors of uniform width $a'$ disposed on the other of said supports in an even plurality of groups of $n$ side-by-side series-connected conductors each, the conductors of said first multiplicity being in inductive relation with the conductors of said second multiplicity, adjacent conductors of each of said groups being uniformly spaced by a distance $b'$, adjacent of said groups being spaced on centers by intervals of $(g \pm h/i)$ $(a+b)$ wherein $g$ and $h$ are odd integers and $i$ is an integer, the product $n(a'+b')$ being equal to the product $(n \pm 2/m)(a+b)$ where $m$ is an integer, at least one of the ratios $a/(a+b)$ and $a'/(a'+b')$ being equal to the ratio $2c/d$ wherein $c$ and $d$ are integers with $c$ smaller than $d/2$, the conductors within each of said groups being inclined to the adjacent conductors of said first multiplicity at a small angle such that the points of nearest approach on said one support to the ends of each conductor of said second multiplicity occupy phases of the interval $2(a+b)$ differing by a simple fraction of that interval, and means interconnecting adjacent of said groups in series such that the direction of current flow transverse of the conductors of said second multiplicity is opposite in adjacent groups.

2. A transformer comprising two relatively movable supports, a first multiplicity of series-connected strip-like conductors of uniform width $a$ disposed side-by-side on one of said supports with a uniform spacing $b$ from each other and extending in directions transverse of the direction of relative movement of said supports, a second multiplicity of similarly extending strip-like conductors disposed on the other of said supports in a plurality of groups of side-by-side series-connected conductors, the conductors of said second multiplicity being in inductive relation with the conductors of said first multiplicity, adjacent ones of said groups being spaced on centers by an odd integral multiple of the interval $a+b$, and means interconnecting said groups in series such that the flow of current between adjacent conductors is opposite in adjacent ones of said groups.

3. A transformer comprising two relatively movable supports, a first multiplicity of series-connected strip-like conductors of uniform width $a$ disposed side-by-side on one of said supports with a uniform spacing $b$ from each other and extending in directions generally perpendicular to the direction of relative movement of said supports, a second multiplicity of similarly extending strip-like conductors of uniform width $a'$ disposed on the other of said supports, the conductors of said second multiplicity being in inductive relation with the conductors of said first multiplicity and being arranged in a plurality of groups of $n$ series-connected conductors side-by-side each, the conductors of said second multiplicity having within each of said groups a uniform spacing $b'$, the product $n(a'+b')$ being substantially equal to the product $(n\pm 2/m)(a+b)$ wherein $m$ is an integer.

4. A transformer comprising two relatively movable supports, a first multiplicity of series-connected strip-like conductors of uniform width $a$ disposed side-by-side on one of said supports with a uniform spacing $b$ from each other and extending in directions generally perpendicular to the direction of relative movement of said supports, and a second multiplicity of series-connected strip-like conductors of uniform width $a'$ disposed side-by-side on the other of said supports with a uniform spacing $b'$ between each conductor thereof and at least one other conductor thereof, the conductors of said second multiplicity being in inductive relation with the conductors of said first multiplicity, at least one of the ratios $a/(a+b)$ and $a'/(a'+b')$ being equal to $2c/d$ wherein $c$ and $d$ are integers with $c$ smaller than $d/2$.

5. A transformer comprising two relatively rotatable supports, means supporting said supports for relative rotation on an axis, a first multiplicity of series-connected strip-like conductors of uniform width $a$ disposed side-by-side on one of said supports in a circularly arcuate array with uniform spacing $b$ from each other, a second multiplicity of strip-like conductors of uniform width $a'$ disposed on the other of said supports in a circularly arcuate array including an even plurality of groups of $n$ side-by-side series-connected conductors each, the conductors of said second multiplicity being in inductive relation with the conductors of said first multiplicity and having within each of said groups a uniform spacing $b'$, the product $n(a'+b')$ being substantially equal to the product $(n\pm 2/m)(a+b)$ wherein $m$ is an integer, adjacent ones of said groups being spaced on centers by an odd integral number of intervals $(a+b)/2$, alternate of said groups being spaced on centers by an odd integral multiple of the interval $a+b$, and means interconnecting alternate of said groups in series such that the flow of current circumferential of said axis is opposite in adjacent series-connected groups, at least one of the ratios $a/(a+b)$ and $a'/(a'+b')$ being substantially equal to $2c/d$ wherein $c$ and $d$ are integers with $c$ smaller than $d/2$.

6. A transformer comprising two relatively movable supports, means for supporting said supports for rectilinear relative motion, a first multiplicity of series-connected strip-like conductors of uniform width $a$ and spacing $b$ disposed side-by-side on one of said supports in an array extending transversely of the length of said conductors and substantially parallel to the direction of rectilinear relative motion of said supports, a second multiplicity of series-connected strip-like conductors of uniform width $a'$ disposed on the other of said members transversely of said direction, the conductors of said second multiplicity being in inductive relation with the conductors of said first multiplicity and being divided into a plurality of groups of $n$ conductors each, the conductors of said second multiplicity having, within each of said groups, a uniform spacing $b'$, the product $n(a'+b')$ being substantially equal to the product $(n\pm 2/m)(a+b)$ wherein $m$ is an integer, adjacent ones of said groups being spaced on centers by an odd integral multiple of the interval $(a+b)/2$, alternate of said groups being spaced on centers by an odd integral multiple of the interval $a+b$, and means connecting alternate of said groups in series such that the flow of current between adjacent conductors is opposite in adjacent series-connected groups.

7. A transformer comprising two relatively movable supports, means supporting said supports for rectilinear relative motion, a first multiplicity of series-connected strip-like conductors of uniform width $a$ and spacing $b$ disposed side-by-side on one of said supports in an array extending transversely of the length of said conductors and substantially parallel to the direction of relative motion of said supports, a second multiplicity of series-connected strip-like conductors of uniform width $a'$ disposed on the other of said supports transversely of said direction, the conductors of said second multiplicity being in inductive relation with the conductors of said first multiplicity and being divided into an even plurality of groups of $n$ conductors each, said groups being aligned into a second array extending transversely of the length of the conductors of said second multiplicity and extending substantially parallel to the direction of relative motion of said supports, the conductors of said second multiplicity having, within each of said groups, a uniform spacing $b'$, the product $n(a'+b')$ being substantially equal to the product $(n\pm 2/m)(a+b)$ wherein $m$ is an integer, adjacent of said groups being spaced on centers by an odd multiple of the interval $(a+b)/2$, and means connecting alternate of said groups in series into two sets each divided into two subsets of at least two groups each, adjacent groups in each subset being spaced on centers by an odd integral multiple of the interval $a+b$, such adjacent groups being connected in series so that the flow of current in directions parallel to said direction of relative motion is opposite in such adjacent groups, adjacent groups in the two subsets of each set being spaced on centers by an even multiple of the interval $a+b$, such last-named adjacent groups being so connected in series that the flow of current in directions parallel to said direction of relative motion is the same therein.

8. A transformer comprising two relatively movable supports, a first multiplicity of series-connected strip-like conductors of uniform width and spacing disposed side-by-side on one of said supports in a first array extending transversely of the length of said conductors and substantially parallel to the direction of relative motion of said supports, and a second multiplicity of series-connected strip-like conductors of uniform width disposed side-by-side on the other of said supports in a second array extending transversely of the length of said second conductors and substantially parallel to said direction of relative motion, the conductors of said second multiplicity being in inductive relation with the conductors of said first multiplicity, the width of the conductors of one of said multiplicities being related to the sum of said last-named width and the spacing between adjacent conductors of said one multiplicity as $2c$ is to $d$ wherein $c$ and $d$ are integers with $c$ smaller than $d/2$.

9. A transformer comprising two supports, means supporting said supports for relative rotation in an axis, a first multiplicity $N=2^e f$ of series-connected strip-like conductors of uniform width $a$ disposed side-by-side on one of said supports in a circularly arcuate array with uniform spacing $b$ from each other, $e$ being an integer and $f$ being an integer incommensurable with 2, a second multiplicity of strip-like conductors of uniform width $a'$ disposed on the other of said supports in a circularly arcuate array including an even plurality $(2^{e+1})f'$ of equiangularly spaced groups of $n$ side-by-side series-connected conductors each, $f'$ being an integral factor of $f$, the conductors of said second multiplicity being in inductive relation with the conductors of said first multiplicity and having within each of said groups a uniform spacing $b'$, and means interconnecting alternate of said groups in series such that the direction of current flow circumferentially of said axis is opposite in adjacent series-connected groups.

10. A transformer comprising two relatively movable supports, a first multiplicity of strip-like conductors of uniform width $a$ and spacing $b$ disposed side-by-side on one of said supports in a first array extending transversely of the length of said conductors and substantially parallel to the direction of relative motion of said supports, and a second multiplicity of strip-like conductors disposed side-by-side on the other of said supports in a second array extending transversely of the length of said second conductors and substantially parallel to said direction of relative motion, the conductors of said second multiplicity being in inductive relation with the conductors of said first multiplicity and being divided into a plurality of groups of $n$ conductors each, adjacent of said groups being spaced from each other on centers by an integral odd multiple of the interval $a+b$, the conductors of each of said groups being divided into a plurality of portions including each $p$ conductors, said portions being spaced from each other on centers by an interval $(g \pm h/i)(a+b)$ wherein $g$ and $i$ are integers and $h$ is an odd integer, the conductors of each of said portions having a width $a'$ and being spaced at uniform intervals $b'$, the product $p(a'+b')$ being substantially equal to the product $(p \pm 2/m)(a+b)$ wherein $m$ is an integer.

11. A transformer comprising two non-ferromagnetic supports, a face on each of said supports, means to support said supports for relative motion with said faces substantially parallel and at substantially constant separation, a first multiplicity of strip-like conductors of uniform width $a$ and spacing $b$ disposed side-by-side on one of said faces in a first array extending transversely of the length of said conductors and substantially parallel to the direction of relative motion of said supports, the conductors of said first multiplicity being connected in series for opposite directions of current flow in adjacent conductors thereof, and a second multiplicity of series-connected strip-like conductors of uniform width $a'$ disposed side-by-side on the other of said faces with a uniform spacing $b'$ between each conductor thereof and at least one other conductor thereof, the conductors of said second multiplicity being in inductive relation with the conductors of said first multiplicity, the conductors of said second multiplicity being connected in series for opposite directions of current flow in adjacent conductors thereof and being inclined to the conductors of said first multiplicity at a small angle such that the points of nearest approach in said one face to the ends of each conductor on said other face occupy phases of the cyclical interval $2(a+b)$ differing by a simple fraction of that cyclical interval.

12. A multipolar winding member for a transformer, said member comprising a support, a multiplicity of strip-like conductors disposed on said support, said conductors being aligned side-by-side in an array extending transversely of the length of said conductors, said conductors having substantially the same shape and having uniform spacing from each other, the width of said conductors being related to the sum of said width and said spacing as $2c$ is to $d$ wherein $c$ and $d$ are small integers with $c$ smaller than $d/2$, and means interconnecting said conductors into a single series circuit such that the direction of current flow is the same in alternate of said conductors and opposite in adjacent ones of said conductors.

13. A multipolar winding member for an air cored transformer, said member comprising a non-conducting non-ferromagnetic support having a plane surface, a multiplicity of strip-like conductors disposed on said surface, said conductors being aligned side-by-side in an array extending transversely of the length of said conductors, said conductors having substantially the same shape and having uniform spacing from each other, the width of said conductors being related to the sum of said width and said spacing as $2c$ is to $d$ wherein $c$ and $d$ are small integers with $c$ smaller than $d/2$, and means interconnecting said conductors into a single series circuit such that the direction of current flow is the same in alternate of said conductors and opposite in adjacent of said conductors.

14. A multipolar winding member for a transformer, said member comprising a support having a plane surface, a multiplicity of strip-like conductors disposed on said surface in a circularly arcuate array with the length of said conductors extending substantially radially of said array, said conductors having substantially the same shape and having uniform spacing from each other, the average width of said conductors being related to the sum of said average width and said spacing as $2c$ is to $d$ wherein $c$ and $d$ are small integers with $c$ smaller than $d/2$, and means interconnecting said conductors into a single series circuit such that the direction of current flow is the same in alternate of said conductors and opposite in adjacent of said conductors.

15. A multipolar winding member for a transformer, said member comprising a support having a surface, a multiplicity of strip-like conductors disposed on said surface in a linear array with the length of said conductors extending transversely of the length of said array, said conductors having substantially the same shape and having uniform spacing from each other, the width of said conductors being related to the sum of said width and said spacing as $2c$ is to $d$ wherein $c$ and $d$ are small integers with $c$ smaller than $d/2$, and means interconnecting said conductors into a single series circuit such that the direction of current flow is the same in alternate of said conductors and opposite in adjacent ones of said conductors.

16. A multipolar winding for a transformer, said winding comprising a support, a multiplicity of strip-like conductors disposed side-by-side on said support in an even plurality of groups forming an array extending transversely of the length of said conductors, and means interconnecting said conductors into a single series circuit such that within each of said groups adjacent conductors are electrically adjacent in said circuit and that the direction of current flow is opposite in such adjacent conductors and such that over said array the sum of the current paths in said interconnecting means transverse of the length of said conductors in one sense is substantially equal to the sum of the current paths in said means transverse of the length of said conductors in the opposite sense.

17. A multipolar winding member for a transformer, said member comprising a support, a multiplicity of strip-like conductors disposed on said support in a plurality of concentric circularly arcuate groups with the length of said conductors extending substantially radially of said groups, and means interconnecting said conductors into a single series circuit such that within each of said groups adjacent conductors are electrically adjacent in said circuit and that the direction of current flow is opposite in such adjacent conductors and such that over the aggregate angle subtended by such groups at the common center thereof the length of the clockwise and counterclockwise circumferential current flow paths in said interconnecting means are substantially equal.

18. A multipolar winding member for a transformer, said member comprising a non-conducting support, a multiplicity of strip-like conductors disposed on said support in a plurality of groups aligned into an array with the length of said conductors extending transversely of the length of said array, said conductors having the same shape and having, within each of said groups, a uniform spacing from each other, and means interconnecting said conductors into a single series circuit such that within each of said groups adjacent conductors are electrically adjacent in said circuit and that the direction of current flow transversely of the length of said array is opposite in such adjacent conductors and such that over the length of said array the sums of the current flow paths in opposite directions lengthwise of said array are substantially equal.

19. A transformer member comprising a support having two windings thereon, each of said windings including a multiplicity of strip-like conductors of uniform width and spacing disposed parallel and side-by-side in an array extending transversely of their length, the sum of the width and spacing of the conductors of one array being equal to the sum of the width and spacing of the conductors of the other array, said arrays being disposed side-by-side and parallel to each other, the conductors of one array being displaced parallel to the length of said arrays from the conductors of the other array by one half of said sum.

20. A transformer comprising two relatively movable supports, a first multiplicity of series-connected strip-like conductors of uniform width $a$ and spacing $b$ disposed side-by-side on one of said supports in an array extending transversely of the length of said conductors and substantially parallel to the direction of relative movement of said supports, a second multiplicity of strip-like conductors of uniform width disposed on the other of said supports in a plurality of groups of $n$ uniformly spaced side-by-side series-connected conductors each, the conductors of said second multiplicity being in inductive relation with the conductors of said first multiplicity, said groups being aligned into an array extending transversely of the conductors thereof and substantially parallel to said direction of relative movement, adjacent ones of said groups being spaced on centers by intervals of $(g \pm h/i)(a+b)$ wherein $g$ is an integer, $i$ is an integer and $h$ is an odd integer, and means connecting said groups in series.

21. A transformer comprising two relatively movable supports, a first multiplicity of strip-like conductors of uniform width $a$ disposed on one of said supports with uniform spacing $b$ in a first array extending transversely of the length of said conductors and substantially parallel to the direction of relative motion of said supports, means interconnecting said conductors into a single series circuit in which alternate of said conductors conduct in the same direction and adjacent ones of said conductors conduct in opposite directions transversely of the direction of relative motion of said supports, a second multiplicity of conductors disposed on the other of said supports in a plurality of groups of $n$ conductors each, the conductors of said second multiplicity being in inductive relation with the conductors of said first multiplicity, said groups being aligned into a second array substantially parallel to said first array with the length of the conductors of said second array extending transversely of the length of said second array, the conductors of said second array having the same shape and a uniform width $a'$ and having within each of said groups a uniform spacing $b'$, said groups being spaced on centers by an odd integral multiple of the interval $a+b$, and means interconnecting the conductors of said second array into a single series circuit in which within each of said groups the direction of current flow is the same in alternate conductors and opposite in adjacent conductors, and in which the direction of current flow in adjacent conductors of adjacent ones of said groups is the same, the product $n(a'+b')$ being further equal to the product $(n \pm 2/m)(a+b)$ wherein $m$ is an integer.

22. A transformer comprising closely spaced relatively movable primary and secondary transformer members in coupling relationship for inducing in said secondary member sinusoidal voltages as a function of different positions of said members, each of said members having a support having a series array of active conductor portions extending transversely of the direction of relative movement of said supports, the conductors of one of said members being strip-like and having a spacing from each other and having a width related to the sum of said width and spacing as $2c$ is to $d$ wherein $c$ and $d$ are small integers with $c$ smaller than $d/2$, said spacing and width relation comprising means for reducing a space harmonic component in the coupling wave between said members.

23. A precision measurement transformer comprising closely spaced relatively movable primary and secondary transformer members in coupling relationship for inducing in said secondary member voltages which are characteristic of different relative positions of said members, each of said members having a support, a first multiplicity of series-connected strip-like conductors of uniform width $a$ disposed side-by-side on one of said supports with a uniform spacing $b$ from each other, a second multiplicity of strip-like conductors of uniform width $a'$ disposed on the other of said supports in an even plurality of groups of $n$ side-by-side series-connected conductors each, adjacent of said groups being spaced on centers by an odd integral multiple of the interval $(a+b)/2$, alternate of said groups being spaced on centers by an odd integral multiple of the interval $a+b$, the conductors of said second multiplicity having within each of said groups a uniform spacing $b'$, the product $n(a'+b')$ being substantially equal to the product $(n+2/m)(a+b)$ wherein $m$ is an integer, and means connecting alternate of said groups in series such that the flow of current between adjacent conductors is opposite in adjacent series-connected groups, at least one of the ratios $a/(a+b)$ and $a'/(a'+b')$ being substantially equal to $2c/d$ wherein $c$ and $d$ are integers.

24. A transformer member comprising a disk of non-conducting, non-ferromagnetic material, and an even number of groups of conductors disposed on said disk in a circular array, each of said groups including a plurality of substantially equiangularly spaced conductors extending radially of said array, the conductors of each of said groups being connected in series with circumferentially adjacent conductors having radially opposite directions of current flow therein, circumferentially alternate of said groups being connected in series, said groups being equiangularly disposed around the center of said array.

References Cited in the file of this patent
UNITED STATES PATENTS

| | | |
|---|---|---|
| 2,608,682 | Herr | Aug. 26, 1952 |
| 2,650,352 | Childs | Aug. 25, 1953 |
| 2,685,070 | Childs | July 27, 1954 |